US011097255B2

(12) United States Patent
Cortes Jacome et al.

(10) Patent No.: US 11,097,255 B2
(45) Date of Patent: Aug. 24, 2021

(54) PROCEDURE FOR OBTAINING A CATALYTIC FORMULATION FOR THE PRODUCTION OF ULTRA LOW SULFUR DIESEL, OBTAINED PRODUCT AND APPLICATION THEREOF

(71) Applicants: INSTITUTO MEXICANO DEL PETROLEO, Mexico City (MX); UNIVERSIDAD NACIONAL AUTONOMA DE MEXICO, Mexico City (MX)

(72) Inventors: Maria Antonia Cortes Jacome, Mexico City (MX); Jose Antonio Toledo Antonio, Mexico City (MX); Jose Escobar Aguilar, Mexico City (MX); Esteban Lopez Salinas, Mexico City (MX); Carlos Angeles Chavez, Mexico City (MX); Enelio Torres Garcia, Mexico City (MX); Jose Gonzalo Hernandez Cortez, Mexico City (MX); Maria de Lourdes Araceli Mosqueira Mondragon, Mexico City (MX); Miguel Perez Luna, Mexico City (MX); Gerardo Ferrat Torres, Mexico City (MX); Jorge Fernando Ramirez Solis, Mexico City (MX); Aida Gutierrez Alejandre, Mexico City (MX)

(73) Assignees: INSTITUTO MEXICANO DEL PETROLEO, Mexico City (MX); UNIVERSIDAD NACIONAL AUTONOMA DE MEXICO, Mexico City (MX)

(*) Notice: Subject to any disclaimer, the term of this patent is extended or adjusted under 35 U.S.C. 154(b) by 22 days.

(21) Appl. No.: 14/742,000

(22) Filed: Jun. 17, 2015

(65) Prior Publication Data
US 2016/0008792 A1 Jan. 14, 2016

(30) Foreign Application Priority Data
Jun. 20, 2014 (MX) ................ MX/A/2014/007510

(51) Int. Cl.
B01J 27/19 (2006.01)
B01J 23/85 (2006.01)
C10G 45/08 (2006.01)
C10L 1/08 (2006.01)
B01J 31/22 (2006.01)
B01J 37/00 (2006.01)
B01J 37/08 (2006.01)
B01J 37/02 (2006.01)
B01J 35/10 (2006.01)
B01J 23/883 (2006.01)
B01J 35/02 (2006.01)
C10G 45/06 (2006.01)
B01J 37/20 (2006.01)

(52) U.S. Cl.
CPC ............. B01J 23/85 (2013.01); B01J 23/883 (2013.01); B01J 27/19 (2013.01); B01J 31/22 (2013.01); B01J 35/026 (2013.01); B01J 35/1019 (2013.01); B01J 35/1042 (2013.01); B01J 35/1047 (2013.01); B01J 35/1061 (2013.01); B01J 37/0009 (2013.01); B01J 37/024 (2013.01); B01J 37/0207 (2013.01); B01J 37/0209 (2013.01); B01J 37/0213 (2013.01); B01J 37/08 (2013.01); C10G 45/06 (2013.01); C10G 45/08 (2013.01); C10L 1/08 (2013.01); B01J 37/20 (2013.01); B01J 2531/60 (2013.01); C10G 2300/1044 (2013.01); C10G 2300/1048 (2013.01); C10G 2300/70 (2013.01); C10G 2400/04 (2013.01); C10L 2200/0438 (2013.01); C10L 2200/0446 (2013.01); C10L 2270/026 (2013.01)

(58) Field of Classification Search
None
See application file for complete search history.

(56) References Cited

U.S. PATENT DOCUMENTS

| 4,172,809 | A  | * | 10/1979 | Triki ................. B01J 21/04 502/241 |
| 6,248,230 | B1 |   | 6/2001  | Min et al. |
| 6,383,975 | B1 |   | 5/2002  | Rocha et al. |
| 6,509,291 | B2 |   | 1/2003  | Eijsbouts |
| 6,531,054 | B1 |   | 3/2003  | Gerritsen et al. |

(Continued)

FOREIGN PATENT DOCUMENTS

| EP | 0969075 | | 1/2000 | |
| WO | WO 2014071686 | * | 5/2014 | ............ B01J 23/881 |

Primary Examiner — Yun Qian
(74) Attorney, Agent, or Firm — Dickinson Wright PLLC

(57) ABSTRACT

The present invention relates to a catalytic formulation used in the hydroprocessing of light and middle oil fractions, preferably in hydrodesulfurization and hydrodenitrogenation reactions to obtain diesel with ultra low sulfur content less than or equal to 15 ppm in weight. The catalytic formulation, object of the present invention, consists of at least one metal of Group VI B and at least one metal of Group VIII B and one element of Group V A of the periodic table deposited on a support based on surface modified alumina with an inorganic oxide of a metal of Group II A, IV A and/or IV B. And containing an impregnated organic compound containing at least one hydroxyl group and at least one carboxyl group and that can contain or not at least one sulfide group in its structure. The catalytic formulation, object of the present invention, allows processing of the oil fractions with initial and final boiling temperatures between 150 and 450° C., with initial nitrogen and sulfur content between 1 and 3% by weight and 200 to 600 ppm, respectively, reducing sulfur content to concentrations lower or equal to 15 ppm and nitrogen concentrations to lower than 1 ppm.

14 Claims, 5 Drawing Sheets

(56) References Cited

U.S. PATENT DOCUMENTS

Figure 1:
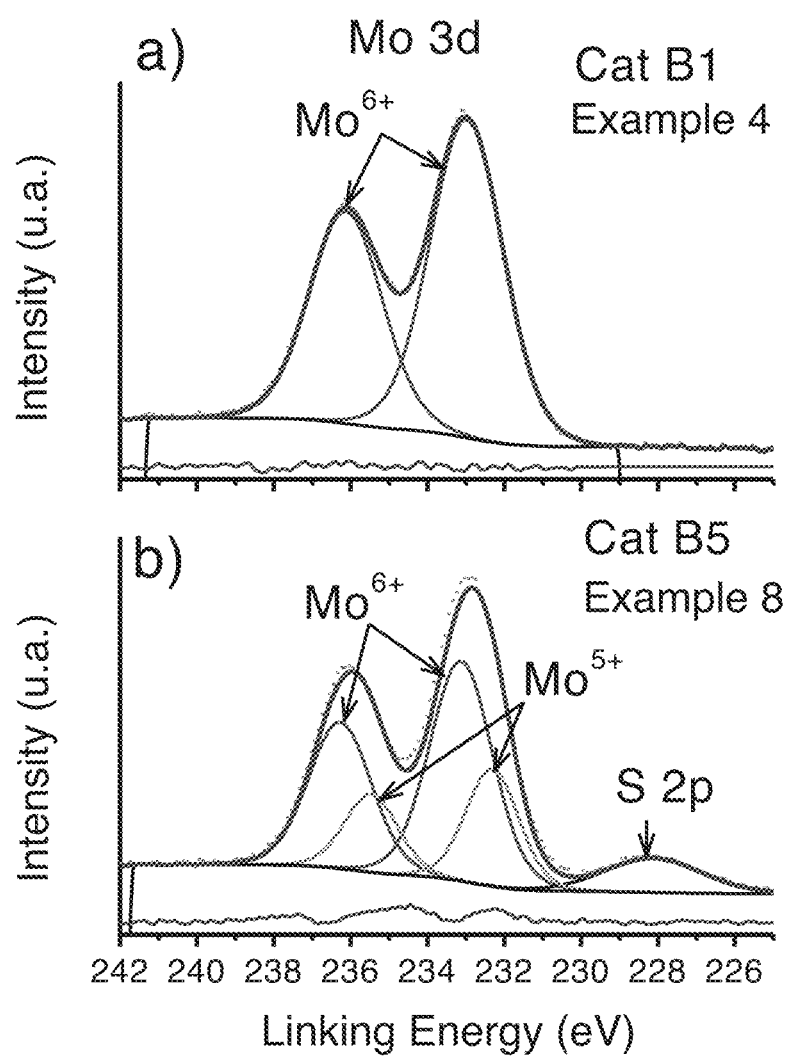

| | | |
|---|---|---|
| 6,753,291 B2 | 6/2004 | Eijsbouts et al. |
| 6,923,904 B1 | 8/2005 | Plantenga et al. |
| 2002/0070147 A1 | 6/2002 | Sonnemans et al. |
| 2012/0083643 A1 | 4/2012 | Rashidi et al. |
| 2015/0306579 A1* | 10/2015 | Yang .................... B01J 23/881 |
| | | 208/216 R |

* cited by examiner

PROCEDURE FOR OBTAINING A CATALYTIC FORMULATION FOR THE PRODUCTION OF ULTRA LOW SULFUR DIESEL, OBTAINED PRODUCT AND APPLICATION THEREOF

FIELD OF THE INVENTION

The present invention relates to a catalytic formulation used in the hydroprocessing of light and intermediate oil fractions, preferably in reactions of hydrodesulfurization and hydrodenitrogenation, to obtain diesel with ultra low sulfur content less than or equal to 15 ppm by weight. The catalytic formulation, object of the present invention, consists of at least one metal Group VI B and of at least one non-noble metal of the Group VIII B and an element of the Group V A of the periodic table, deposited on a carrier based on surface modified alumina with an inorganic oxide of a metal of the Group II A, IV A and/or IV B, which contains an organic compound impregnated therein with at least one hydroxy group and at least one carboxyl group and that can contain or not at least one sulfide group in its structure. The catalytic formulation, object of the present invention, allows to process oil fractions at initial and final boiling temperatures included between 150 to 450° C., with initial contents of sulfur and nitrogen included between 1 and 3% by weight and 200 to 600 ppm, respectively, decreasing the content of sulfur in the diesel product at concentrations lower or equal to 15 ppm and of nitrogen at concentrations lower than 1 ppm.

BACKGROUND OF THE INVENTION

Government environmental protection agencies demands for fuels with lower content of pollutants such as sulfur, nitrogen, nickel, vanadium, among others. In addition, to take advantage of the oil reserves, it is necessary to process streams increasingly heavier, and content of those pollutants increases in fuels produced. Therefore, it is necessary the development of new materials and catalytic processes that eliminate those pollutants of hydrocarbons or fossil fuels more efficiently, to minimize emissions of polluting gases during combustion in internal combustion engines and so comply with environmental regulations increasingly more rigorous.

The most efficient industrial process for the removal of pollutants from fossil fuels is hydroprocessing, which apply to all oil fractions, such as: gasoline, diesel, feedstock to catalytic disintegration (FCC) processes and other intermediate and heavy distillates. For the specific case of the present invention are considered light oil fractions, those that include hydrocarbons whose boiling points are equal or lower at 180° C., and as intermediate oil fractions, to those that include hydrocarbons whose boiling points are equal or higher to 180.1° C. and less or equal to 450° C.

In hydroprocessing processes, light and middle oil fractions are hydrotreated and/or hydrodesintegrated in presence of hydrogen. Hydroprocessing include all operations in which a fraction of hydrocarbons react with hydrogen at high pressure and temperature, and includes processes such as: hydrogenation, hydrodesulfurization, hydrodenitrogenation, hydrodemetallization, hydrodearomatization, hydroisomerization and hydrodesintegration.

Catalysts formulations commonly used hydrodesulfurization processes, are made of a refractory material such as alumina on which surface are distributed metals such as cobalt, nickel, molybdenum and tungsten and mixture of these. The catalytic formulations of cobalt promoted molybdenum-alumina, are generally used when limiting specifications are solely those of hydrodesulfurization, while the catalytic formulations of nickel promoted molybdenum-alumina are widely used, when in addition to hydrodesulfurization, hydrodenitrogenation and partial aromatics saturation (hydrodearomatization) is required in the fraction submitted to hydrotreating, due to the high inherent hydrogenating activity of nickel.

Procedures for the preparation of the catalytic formulations for hydroprocessing have been addressed in different patents. Particularly, the U.S. Patent Application US2002/0,070,147 addresses a catalytic formulation containing 17.25% by weight of metals (nickel and molybdenum), and 1.53% by weight of phosphorus, in alumina support. That catalytic formulation reduces the sulfur content of a feedstock from 12,000 ppm to 21 ppm of S, with an initial content of nitrogen of 86 ppm, developing the hydrodesulfurization at 330° C., pressure at 4 MPa, hydrogen/hydrocarbon ratio ($H_2$/HC) of 1685 $ft^3$/bbl (cubic feet/barrel of oil processed) and space-velocity of 2 $h^{-1}$. The same catalytic formulation at a temperature of 340° C. at 2 MPa, $H_2$/HC ratio of 1685 $ft^3$/bbl and space-velocity of 1.5 $h^{-1}$, reduces the sulfur content to 51 ppm.

On the other hand, the U.S. Pat. No. 6,509,291 B2 describes a catalytic formulation containing 19.14% by weight of metals as molybdenum and nickel catalytic supported on alumina, that formulation processes feedstocks with sulfur content of 12,000 ppm and 115 ppm of nitrogen and reduce the sulfur content to 105 ppm at temperature and pressure conditions of 340° C. and 3 MPa, respectively, $H_2$/HC ratio of 702 $ft^3$/bbl and space-velocity of 2 $h^{-1}$.

U.S. Pat. No. 6,923,904 B1, described in example 1 a catalytic formulation with 17.25% by weight of nickel and molybdenum metals, with 1.3% by weight of phosphorus and diethylene glycol, wherein metals and additives are deposited on alumina. That catalytic formulation, from a feedstock containing 219 ppm of sulfur and 28 ppm of nitrogen and during the hydrodesulfurization process reduces the sulfur content to 5 ppm and the nitrogen content to <5 ppm. The operating conditions were: temperature of 323° C., pressure of 6 MPa, $H_2$/HC ratio of 1685 $ft^3$/bbl and space-velocity of 2 $h^{-1}$. That development obtain diesel with low levels of sulfur and nitrogen impurities, both from feedstocks with very low initial content of such pollutants.

On the other hand, the U.S. Pat. No. 6,753,291 B2 similarly describes a catalytic formulation that contains 21.02% by weight of nickel and molybdenum metals with 1.46% of phosphorus and diethylene glycol as organic additive, metals and additives supported on alumina, said catalytic formulation processes a feedstock with 12,000 ppm of sulfur and 115 ppm of nitrogen and during the hydrodesulfurization process is reduced the sulfur content to 1600 ppm and 54 ppm of nitrogen, when said process takes place at a temperature of 340° C., pressure of 3 MPa, $H_2$/HC ratio of 702 $ft^3$/bbl and space-velocity of 2 $h^{-1}$. With the same above conditions, but with a space-velocity of 1 $h^{-1}$ and a $H_2$/HC ratio of 1404 $ft^3$/bbl, a final product with 300 ppm of sulfur and 25 ppm of nitrogen is obtained.

European Patent Application EP 0,969,075 A1 address a catalytic formulation "E", which contains 20.58% by weight of nickel and molybdenum metals with 0.65% by weight of phosphorus, metals, and additive supported on alumina-zeolite, which processing a feedstock that initially contains 13,500 ppm of sulfur and 20 ppm of nitrogen, obtained a product with sulfur content of 230 ppm at temperature conditions of 350° C., pressure of 3.5 MPa, and space-velocity of 1.5 h$^{-1}$. When phosphorus content is increased from 0.65 to 1.53% by weight, the sulfur in the final product is reduced from 230 to 160 ppm.

U.S. Pat. No. 6,531,054 B1 describes a catalytic formulation containing 16.47% of metals nickel and molybdenum with 1.3% by weight of phosphorus, supported on alumina, which processes a feedstock containing 16,145 ppm of sulfur and 113 ppm of nitrogen, obtaining a product with 470 ppm of sulfur and 61 ppm of nitrogen, at temperature conditions of 350° C., pressure of 3.5 MPa, H$_2$/HC of 843 ft$^3$/bbl and space-velocity of 1.8 h$^{-1}$. When the temperature is increased to 363° C., said catalyst is able to reduce the content of sulfur to 100 ppm and that of nitrogen to 36 ppm.

According to the U.S. Pat. No. 6,383,975 B1, a catalytic formulation with 13.94% by weight of nickel and molybdenum metals, with 1.3% by weight of phosphorus, metals and additive deposited on alumina-titania, process a feedstock containing 12,600 ppm of sulfur and 367 ppm of nitrogen and reduce the content of sulfur in the product to 1023 ppm and to 268 ppm that of nitrogen at temperature of 350° C., pressure of 5.56 MPa, H$_2$/HC ratio of 2600 ft$^3$/bbl and space-velocity of 2 h$^{-1}$.

Table 1 presents a summary of the catalytic performance of catalytic formulations based on nickel and molybdenum as active phase reported in some patents known to the applicant. The metal content, support type, composition of the feedstock, operating conditions and sulfur and nitrogen content in the final product are also reported. In most of the feedstocks that have been used, the sulfur and nitrogen content did not exceed 1.5% by weight and 200 ppm of nitrogen, respectively, i.e., with feedstocks of very low sulfur and nitrogen content ultra low sulfur diesel (ULSD) as a product with less than 15 ppm sulfur content is obtained. It is therefore required to develop catalytic formulations with increased activity, that are able to obtain ULSD from feedstocks of contents greater than 1.5% by weight of sulfur and that of nitrogen over 200 ppm.

Data on catalytic performance in the hydrodesulfurization of gas-oil, in catalytic formulations containing cobalt and molybdenum as active phase that have been reported in the literature, are summarized in Table 2. It can be seen that the U.S. Pat. No. 6,248,230 B1, which describes a catalytic formulation with 14.11% by weight of cobalt and molybdenum metals supported on alumina, processed feedstocks with different content of sulfur and nitrogen. Regardless of the initial concentration of sulfur, when nitrogen concentration is greater than 100 ppm, diesel with sulfur content above 100 ppm is obtained at temperature of 354° C., pressure of 5.77 MPa, LHSV=1.88 h$^{-1}$ and H$_2$/HC ratio of 955 ft$^3$/bbl. Diesel with 18 ppm of sulfur is obtained when the nitrogen content in the feedstock is 48.4 ppm. In that patent, the effect of nitrogen compounds in the feedstock is observed, since it is required to reduce their content below 50 ppm to achieve levels of ultra low sulfur in the final product, so it is required to undergo the feedstock to an adsorption process, to decrease the content of nitrogen compounds originally present.

In the U.S. Patent Application US 2012/0,083,643, wherein the metal phase cobalt molybdenum was deposited on a support of alumina modified with zeolite and ULSD is obtained at not severe conditions from a gas-oil with initial sulfur content of 1.35% by weight; however, the nitrogen content of the feedstock was not reported. In the Patent Application PA/a/1995/004576, in which a feedstock with a high nitrogen content is hydrotreated with a catalytic formulation with active phase composed of cobalt and molybdenum metals on an alumina support, a diesel product with sulfur of 1143 ppm by weight is obtained.

Generally, it is noted that the problem for obtaining ULSD, is not only the initial sulfur content in the feedstock but also the nitrogen content that inhibits the performance of the catalytic formulations should be considered. In addition, other components should be measured, such as the concentration of refractory sulfur molecules or di-benzothiophenes branched with alkyl groups, such as 4,6-dimethyl-di-benzothiophene, aromatic compounds, heavy metals and coke. As the light crude depletes, in countries such as Mexico, where most of the oil reserves corresponds to heavy type, hydrocarbons cuts, obtained from distillation processes, usually contain high levels of sulfur and nitrogen, metals, aromatic impurities, and new catalytic formulations are required, allowing to perform hydrodesulfurization and hydrodenitrogenation in those hydrocarbon fractions with high initial contaminants levels.

The present invention relates to the process and catalytic formulations highly active to obtain diesel with ultra low sulfur by hydrotreating the oil fractions of intermediate oil cuts. The catalytic formulations, object of the present invention, consist of at least one non-noble metallic element of Group VIII B, of at least one element of Group VI B, and a third component that can be an element of Group II A, or VA, VIIA of the periodic table deposited in a support based on surface modified alumina with an inorganic oxide of a metal of the Group II A, IV A and IV B and of an organic component that can contain or not sulfur atoms in its composition, which function is to weaken or inhibit the interaction of active metal phases with the support, to increase the density of active sites for reactions of hydrotreating and hydrodesulfurization, specifically hydrodenitrogenation.

All the references listed above, are surpassed by the present invention, by that is related to a process and highly active catalytic formulations to obtain diesel with ultra low sulfur by hydrotreating hydrocarbons fractions of intermediate oil cuts.

All the references listed above, are surpassed by the present invention, and highly active catalytic formulations to obtain diesel with ultra-low sulphur by the intermediate courts of petroleum hydrocarbons fractions hydrotreating.

Catalytic formulations object of the present invention, consist of at least one not noble metallic element of VIII b, at least one element of Group VI B, and a third component that is an element of Group II A, or IV A and IV B of the periodic table deposited on a support based on surface modified alumina with an inorganic oxide, and an organic component containing or not sulfur atoms in its composition, which function is to weaken or inhibit the interaction of metal phases with the support, to increase the density of active sites for hydrotreating reactions, specifically hydrodesulfurization and hydrodenitrogenation.

Therefore, one of the objects of the present invention is to obtain an alumina support from a precursor of boehmite phase, which is formulated in cylindrical, trilobular or tetralobular extrudates with crush strength of more than 3 lb$_f$/mm, by the addition of a solution containing an organic or inorganic acid for the paste formulation with the proper consistency to be extruded. Once obtained the extrudates, they are dried and calcined at temperatures above 500° C., to obtain the support in alumina phase extrudates. The retrieved extrudate is subjected to a process of surface modification, which consists of the impregnation of an inorganic oxide concentration at less than or equal to 15% by weight and its subsequent calcination at temperature above 500° C., thus is obtained a support with surface features suitable for the preparation of catalytic formulations for hydrotreatment process.

Another object of the present invention, is the procedure of the integration of the active phases to support made of extrudates and modified with an inorganic oxide. It consists of the aqueous solution of precursor salts of, at least one non-noble metallic component of Group VIII B and, at least one component of Group VI B and a third component that consists of an inorganic acid. The resulting suspension is subjected to a treatment of thermal digestion consisting in refluxing the suspension at a constant temperature between 50 and 100° C., in order to obtain a solution with fully dissolved metal components. Subsequently, that is concentrated to reduce the volume of the solution to the volume required to fill the pores of the support, to this solution is added or not an organic compound. Subsequently, it is performed the impregnation by the method of incipient wetting, or pore filling by contacting solution containing active components with the extrudates from the support of alumina modified with an oxide inorganic, leaving to stand for a period between 4 and 24 h. Finally, resulting material is dried at temperatures between 60 and 120° C., If the impregnation solution used contains no organic compound, the material is calcined at a temperature between 400 and 700° C., whereas if the impregnation solution contains organic compound, the catalytic formulation does not require to be calcined.

Another object of the present invention is the addition of an organic compound that interacts with the active metallic (Me) components and weaken their interaction with the support, once the metal components have been integrated to support modified with an inorganic oxide and calcined at temperatures above 400° C. Impregnation of the organic compound is made by incipient wetting by organic or aqueous solution containing an organic (ORG) compound dissolved at a concentration, such that allow to obtain a ORG/Me molar ratio between 0.1 and 2.0 in the final catalytic formulation. Subsequently, the catalytic formulation is dried at temperatures between 60 and 120° C.

Another object of the present invention is the process of activation of the obtained catalytic formulation containing an organic compound integrated either in the impregnating solution or a catalytic formulation already impregnated with the active phases in its 23 oxidized and calcined phase, which consists of obtaining active components as sulfided form, through an activation procedure that relies on contacting the catalytic formulation with a liquid hydrocarbon stream doped with dimethyldisulfide (DMDS) at a sulfur concentration that are greater than or equal to 2.5% by weight, and with a hydrogen flow including pressure between 20 and 40 kg/cm$^2$, keeping a hydrogen/hydrocarbon ratio between 1500 and 2500 ft$^3$/bbl (cubic feet/gas-oil processed barrel). Subsequently, the temperature of the system is increased in various stages of heating, initially rising from ambient temperature (25° C.) to 135° C., at a speed of between 10 to 50° C./h, keep this condition between 1 and 10 h; then, the temperature is raised from 135 to 270° C., at a heating rate of between 10 and 50° C./h, keeping the system at this temperature for 1 to 10 h; to increase again the temperature from 270 to 290° C., at a heating rate of between 10 and 50° C./h, keeping the system at this temperature for 1 to 10 hours, and finally increases the temperature from 290 to 340° C. at a heating rate of between 10 and 50° C./h, keeping the system at this temperature for 1 to 5 h. Upon completion of various activation stages, the system is adjusted to the conditions required for catalytic evaluation.

Another object of the present invention is the process of obtaining ultra low sulfur diesel with any of the catalytic formulations of this invention, from known hydrocarbon fractions as primary light gas oil, light cyclic oil and coker gas oil and mixture thereof, which initial and final boiling temperature fall between 150 and 450 SC and initial sulfur content included between 0.5 and 3.0% by weight and initial nitrogen contents falling between 100 and 500 ppm. Said process takes place at temperatures ranging between 300 and 450° C., H$_2$ partial pressure between 40 and 90 kg/cm$^2$, ratio hydrogen/hydrocarbon between 1500 to 3500 ft$^3$/bbl and space-velocity included between 0.5 and 2.5 h$^{-1}$.

Furthermore, another object of the present invention is the process of obtaining ultra low sulfur diesel with a mixture of the catalytic formulations obtained in the present invention, locating the catalytic formulation with high hydrogenating activity in the right position to make the denitrogenation to eliminate the inhibitor effect of nitrogen compounds and allow the catalytic formulation with high desulfurizing activity to reach the ultra low levels of sulfur in diesel product. The catalytic formulation with high hydrogenating activity is the formulation in which non-noble element of the Group VIII B is specifically nickel, while in the catalytic formulation with high desulfurizing activity, the non-noble element of Group VIII B is cobalt.

Obtaining the diesel with the mix of the catalytic formulations takes place from fractions of hydrocarbons whose initial and final boiling temperatures are between 150 and 450° C. and initial sulfur content included between 0.5 and 3.0% by weight and initial nitrogen content between 100 and 500 ppm by weight. That process takes place at temperatures ranging between 300 and 450° C., H$_2$ partial pressure between 40 and 90 kg/cm$^2$, hydrogen/hydrocarbon ratio as between 1500 and 3500 ft$^3$/bbl and space-velocity between 0.5 and 2.5 h$^{-1}$.

BRIEF DESCRIPTION OF DRAWINGS OF THE INVENTION

In order to get an understanding of the catalytic formulation, object of the present invention, used to obtain ultra low sulfur diesel in the hydroprocessing of light and middle oil fractions, it will be referred to the drawings presented:

In FIG. 1, subsection b) the spectrum of X ray photoelectron spectroscopy (XPS) for molybdenum is shown, which forms a charge-transfer complex of donator ligand-metal acceptor. i.e., electrons are transferred from the ligand to the metal, reducing the charge on the metal components of Group VI B partially to an oxidation state of $^{5+}$, specifically the molybdenum of catalytic formulation B5 obtained in Example 8, while, when the organic compound is not added, subsection a), the component of Group VI B, remains entirely in oxidation state of $^{5+}$, specifically the molybdenum, in catalytic formulation B1, obtained in Example 4.

TABLE 1

Catalytic performance of formulations based on NiMo reported on patent.

| | % by weight | | | | Feedstock | | Reaction conditions | | | | Diesel Product | | |
| | | Additives | | | S | N | T | LHSV | H$_2$/HC | P | S | N | |
| Pat. No. | Ni + Mo | P | Org | Support | ppm | ppm | (° C.) | (h$^{-1}$) | ft$^3$/bbl | MPa | ppm | ppm | Cat. |
|---|---|---|---|---|---|---|---|---|---|---|---|---|---|
| US20020/070,147A1 | 17.25 | 1.53 | N.D. | A | 12,000 | 86 | 340 | 1.5 | 1,685 | 4 | 21 | ND | Ex 1 |
| US20020/070,147A1 | 17.25 | 1.53 | N.D. | A | 12,000 | 86 | 330 | 1.5 | 1,685 | 2 | 51 | ND | Ex 1 |
| U.S. Pat. No. 6,509,291 B2 | 19.14 | 0 | ND | A | 12,000 | 115 | 340 | 2 | 702 | 3 | 105 | ND | Ex 1 |
| U.S. Pat. No. 6,509,291 B2 | 19.14 | 0 | ND | A | 12,000 | 115 | 340 | 2 | 702 | 3 | 108 | ND | Ex 1 |
| U.S. Pat. No. 6,923,904 B1 | 17.25 | 1.3 | DEG | A | 219 | 28 | 323 | 2 | 1,685 | 3 | 20 | <5 | Ex 1 |
| U.S. Pat. No. 6,923,904 B1 | 17.25 | 1.3 | DEG | A | 219 | 28 | 323 | 2 | 1,685 | 6 | <5 | <5 | Ex 1 |
| U.S. Pat. No. 6,753,291 B2 | 21.02 | 1.46 | DEG | A | 12,000 | 115 | 340 | 2 | 702 | 3 | 1,600 | 54 | Ex 1 |
| U.S. Pat. No. 6,753,291 B2 | 21.02 | 1.46 | DEG | A | 12,000 | 115 | 340 | 1 | 1,404 | 3 | 300 | 25 | Ex 1 |
| EP,096,9075A1 | 17.25 | 0 | 0 | A | 13,500 | 20 | 340 | 1.5 | ND | 3.5 | 319 | ND | M |
| EP0,969,075A1 | 17.25 | 0.65 | 0 | A | 13,500 | 20 | 350 | 1.5 | ND | 3.5 | 230 | ND | H1 |
| EP0,969,075A1 | 20.58 | 0.65 | 0 | AHY | 13,500 | 20 | 340 | 1.5 | ND | 3.5 | 228 | ND | E |
| EP0,969,075A1 | 17.25 | 0.65 | 0 | AHY | 13,500 | 20 | 350 | 1.5 | ND | 3.5 | 140 | ND | B |
| EP,096,9075A1 | 17.25 | 1.53 | 0 | AHY | 13,500 | 20 | 350 | 1.5 | ND | 3.5 | 160 | ND | C1 |
| U.S. Pat. No. 6,531,054 B1 | 10.47 | 1.3 | 0 | AS | 16,000 | 113 | 330 | 3.5 | 843 | 3.5 | 1,160 | 82 | Ex 1 |
| U.S. Pat. No. 6,531,054 B1 | 16.47 | 1.3 | 0 | AS | 16,000 | 113 | 350 | 1.8 | 843 | 3.5 | 470 | 61 | Ex 1 |
| U.S. Pat. No. 6,531,054 B1 | 16.47 | 1.3 | 0 | AS | 16,000 | 113 | 363 | 1.5 | 843 | 3.5 | 100 | 36 | Ex 1 |
| U.S. Pat. No. 6,383,975 B1 | 13.94 | 1.3 | 0 | ATi | 12,600 | 367 | 350 | 2 | 2600 | 5.5 | 1023 | 268 | CAT A |

N.D.: Not determined, P: phosphorus, DEG: diethylene glycol, A: Alumina, HAY: Alumina-zeolite, AS: Alumina-silica, ATi: Alumina-titania, Cat. Catalyst.

TABLE 2

Catalytic performance of catalytic formulations based on CoMo reported in patent.

| | % by weight | | | Feedstock | | Reaction conditions | | | | Diesel product | | |
| | | Additives | | S | N | T | LHSV | H$_2$/HC | Pres. | S | N | |
| Pat. No. | Co + Mo | P | Support | ppm | ppm | (° C.) | (h$^{-1}$) | ft$^3$/bbl | MPa | ppm | ppm | Cat. |
|---|---|---|---|---|---|---|---|---|---|---|---|---|
| U.S. Pat. No. 6,248,230 B1 | 14.11 | 0 | A | 12,286 | 226 | 340 | 1.88 | 955 | 5.77 | 756 | N.D. | Ex 15 |
| U.S. Pat. No. 6,248,230 B1 | 14.11 | 0 | A | 12,286 | 226 | 354 | 1.88 | 955 | 5.77 | 115 | N.D. | Ex 15 |
| U.S. Pat. No. 6,248,230 B1 | 14.11 | 0 | A | 12,286 | 101.7 | 354 | 1.88 | 955 | 5.77 | 40 | N.D. | Ex 15 |
| U.S. Pat. No. 6,248,230 B1 | 14.11 | 0 | A | 14,056 | 156 | 354 | 1.88 | 955 | 5.77 | 158 | N.D. | Ex 15 |
| U.S. Pat. No. 6,248,230 B1 | 14.11 | 0 | A | 14,056 | 62.4 | 354 | 1.88 | 955 | 5.77 | 75 | N.D. | Ex 15 |
| U.S. Pat. No. 6,248,230 B1 | 14.11 | 0 | A | 15,420 | 173 | 354 | 1.88 | 955 | 5.77 | 108 | N.D. | Ex 15 |
| U.S. Pat. No. 6,248,230 B1 | 14.11 | 0 | A | 15,420 | 69.2 | 354 | 1.88 | 955 | 5.77 | 39 | N.D. | Ex 15 |
| U.S. Pat. No. 6,248,230 B1 | 14.11 | 0 | A | 15,420 | 48.4 | 354 | 1.88 | 955 | 5.77 | 18 | N.D. | Ex 15 |
| US2012/0,083,643 | ~11 | 5 | AHY | 13,500 | ND | 330 | 2 | 1,124 | 3.5 | 30 | N.D. | C.8-1 |
| US2012/0,083,643 | ~15 | 5 | AHY | 13,500 | ND | 330 | 2 | 1,124 | 4 | 14 | N.D. | C.4.8 |
| US2012/0,083,643 | ~15 | 5 | AHY | 13,500 | ND | 335 | 2 | 1,124 | 3.5 | 15 | N.D. | C.4.7 |
| PA/a/1995/004576 | 13.11 | 1.69 | A | 12,600 | 367 | 350 | 2 | 2,600 | 5.5 | 1,143 | 289 | CAT D |

Figure 2:
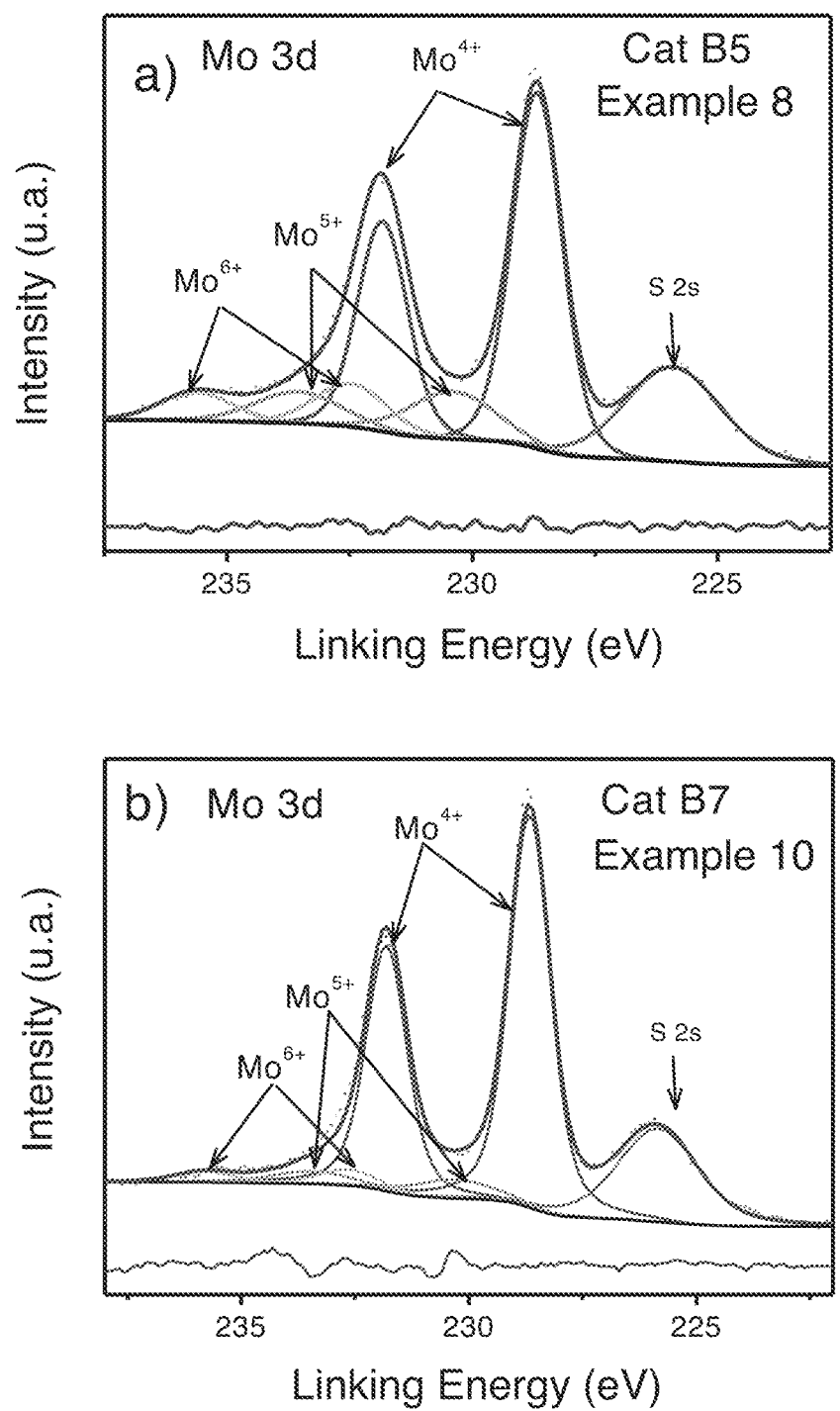

N.D.: Not determined, P: phosphorus, A: Alumina, HAY: Alumina-zeolite, Cat.: catalyst FIG. 2 shows a spectrum of X ray photoelectron spectroscopy (XPS) for molybdenum on alumina and alumina support modified with inorganic oxide where this last support showed inhibition of the interaction of the metal component with the support. Subsection a) presents Mo 3d signal for the catalytic formulation prepared on a support of unmodified alumina, with an Inorganic oxide and with addition of organic compound. As described for the catalytic formulation B5 in Example 8, only 70% of the molybdenum surface atoms present state oxidation $^{4+}$, indicating molybdenum sulfurability of 70%, while subsection b) for the catalytic formulation prepared on a support of alumina superficially modified with silicon oxide, the catalytic formulation B7, Example 10, Mo 3d signal, shows that most of the molybdenum surface atoms are reduced to $^{4+}$, indicating that more than 90% of them have been sulfided, generating a greater number of active sites, when the catalytic formulations are rich in sulfur through the procedure of activation, object of the present invention.

Figure 3:
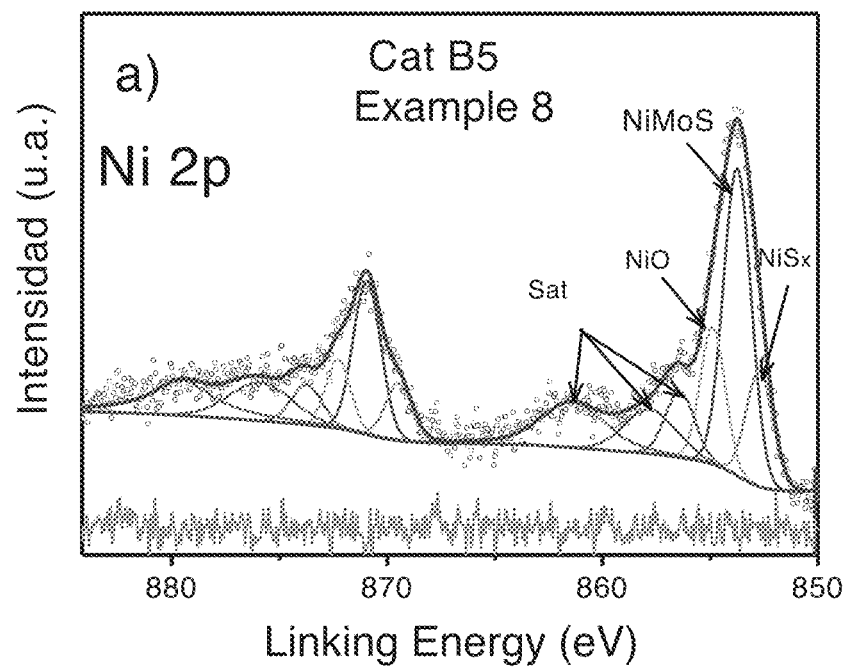
Figure 3:
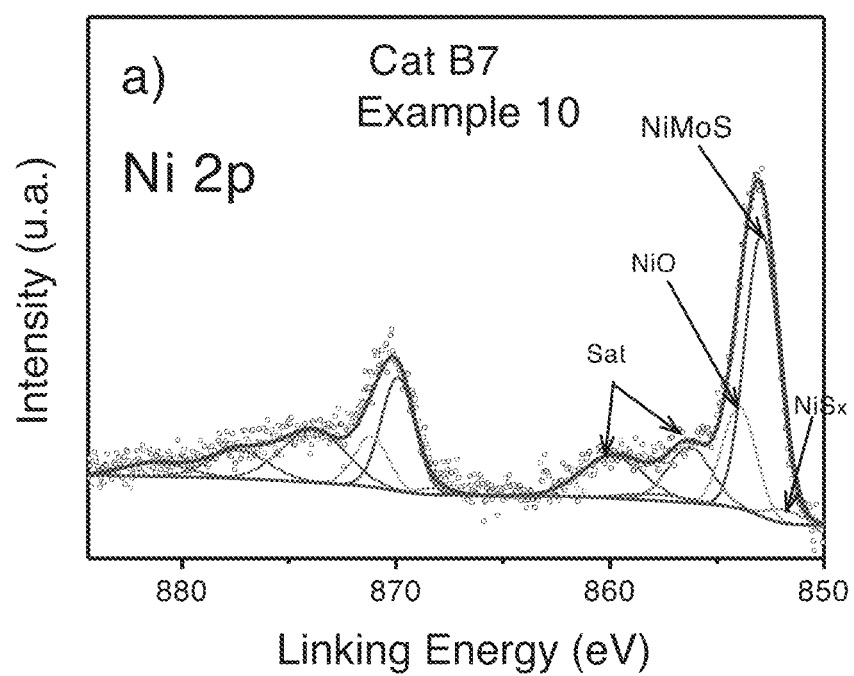

In FIG. 3 XPS spectra for Ni 2p are presented. Subsection a) presents the spectrum for catalytic formulation B5, prepared as in Example 8, on support of alumina unmodified with inorganic oxide, to which was added an organic compound, there is noted that a considerable fraction of the atoms of nickel are sulfided, forming NiS$_x$ segregated species; about 50% of Ni atoms promotes MoS$_2$, forming the NiMoS phase, and about 25% stays in NiO oxidized state. While when catalytic formulation is prepared on a support modified with silicon oxide, catalytic formulation B7 prepared as described in Example 10, a larger fraction of Ni is sulfided promoting MoS$_2$, forming NiMoS phase, about 70%, while only 5% is sulfided forming NiSx segregated phases and 25% stays in oxidized state.

Figure 4:
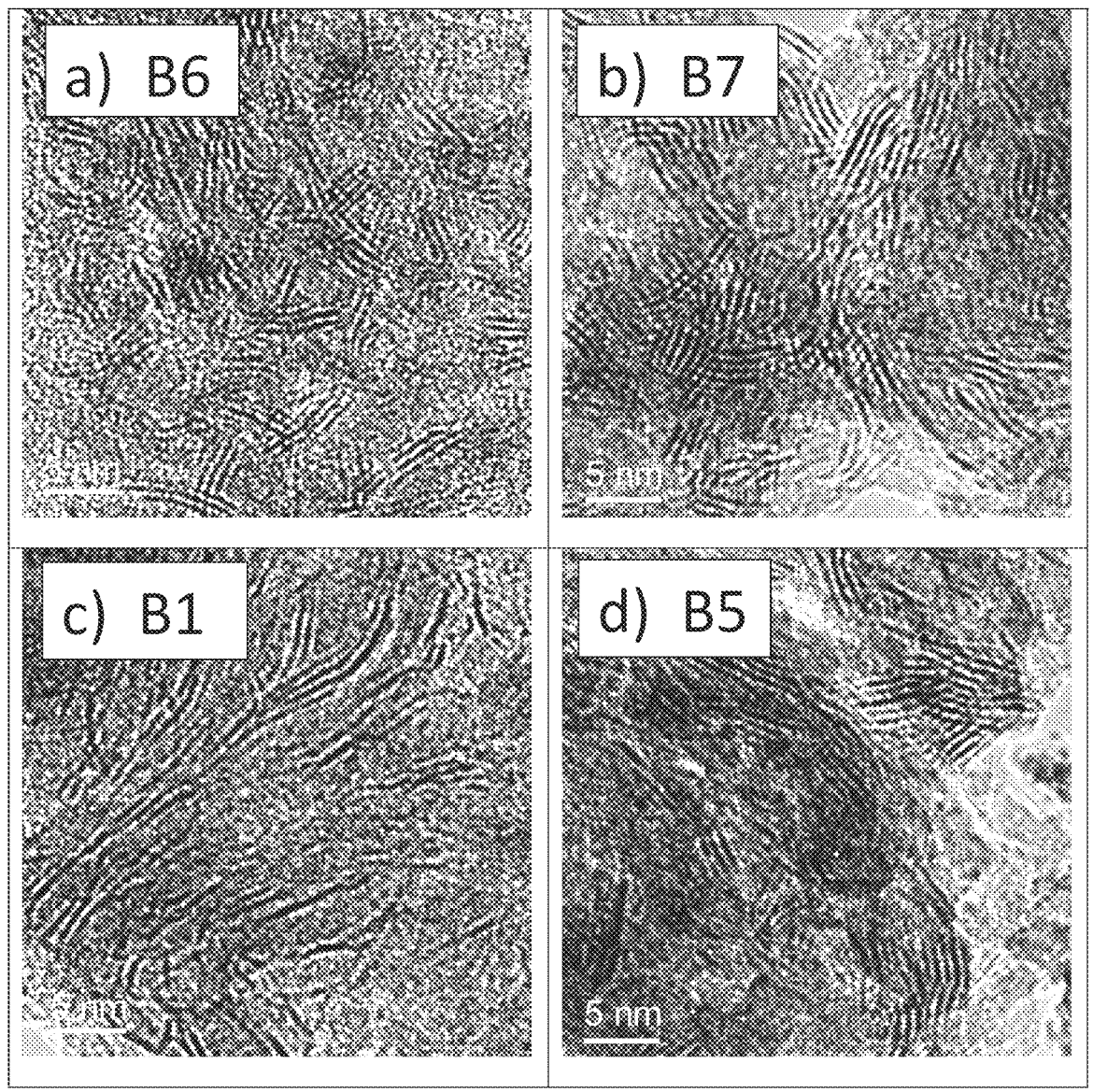

FIG. 4 presents images of transmission electron microscopy for the catalytic formulation B6, prepared as in Example 9, on a support modified with silicon oxide without added organic compound. In subsection a) nanoclusters of MoS$_2$ are observed with average lengths of 4.47 nm, with average stacking level of 3.73 sheets. While when the organic compound is added, in catalytic formulation B7 prepared as described in Example 10, over a support of alumina modified with silicon oxide, subsection b) average nanoclusters length of $MoS_2$ decreases to 4.28 nm and average stacking level grows to 3.99 sheets. This behavior is most evident when the catalytic formulation is prepared on an alumina support unmodified with inorganic oxide, not adding organic compound, the catalytic formulation B1, prepared as described in Example 4, see subsection c) very long clusters of $MoS_2$ are obtained with average dimensions of 5.03 nm and average stacking level of 2.48 sheets, while adding organic compound the catalytic formulation B5 prepared as described in Example 8, see subsection d), the average nanoclusters length of $MoS_2$ are retained with 5.07 nm. However, the average stacking level grow to 2.63 sheets.

Figure 5:
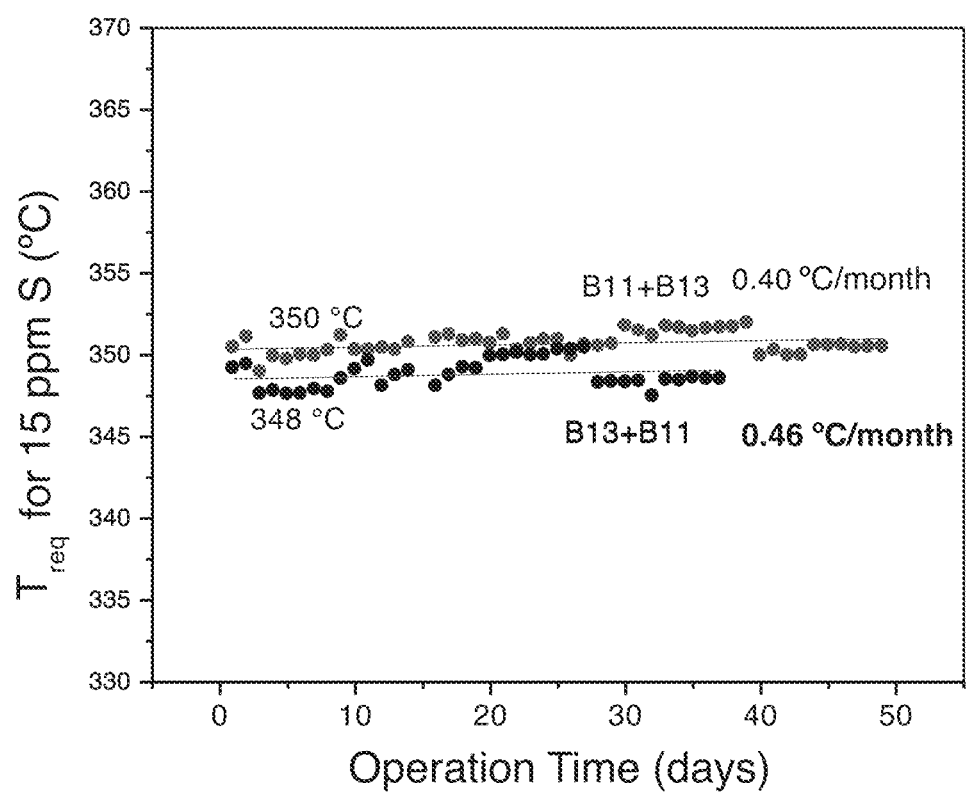

FIG. 5 presents the evaluation of the catalytic performance of the formulations with CoMo active phase, catalytic formulation B13 as described in Example 16, in stacked catalytic beds with a formulation with NiMo active phase, catalytic formulation B11 prepared as described in Example 14, in obtaining of ULSD from gas-oil, which properties and characteristics are presented in Table 3. This figure shows that when certain volume of catalytic formulation B13 to the Inlet of the reactor and another equal volume is located in the catalytic formulation B11 at the outlet, the temperature required to obtain diesel of 15 ppm of sulfur, is 348° C., whereas when the formulations are reversed, placing at the top the catalytic formulation B11 and at the bottom the catalytic formulation B13, a temperature of 350° C. is required to get 15 ppm of S in diesel product, maintaining the LHSV at 1.5 $h^{-1}$, pressure of 70 $kg/cm^2$, and hydrogen/hydrocarbon ratio of 2500 $ft^3$/bbl. Additionally, there is a high stability of the catalytic formulation with a deactivation rate of about 0.4° C./month.

DETAILED DESCRIPTION OF THE INVENTION

The present invention refers to the hydrotreating process and procedure to obtain the highly active catalytic formulations in reactions of hydrotreating, specifically in reactions of hydrodesulfurization and hydrodenitrogenation, to obtain diesel with ultra low sulfur content, from fractions of hydrocarbons contained in oil with high initial sulfur and nitrogen contents between 0.5 and 5% by weight and 200 to 600 ppm, respectively.

The catalytic formulations, object of the present invention, consist of metallic components that comprise at least one element of the Group VI B and at least one non-noble element of Group VIII B, and optionally an inorganic additive, preferably an acid that contains phosphorus. Such components are deposited on a support based on alumina which surface is modified with an inorganic oxide, which can be silicon oxide, titanium oxide, zirconium oxide, magnesium oxide, etc. And an organic additive, which may contain one or more hydroxyl or carboxyl groups in its structure, and may or may not contain sulfur, which can be glycolic acid, thioglycolic acid, malic acid, citric acid, sucrose, etc.

The procedure for preparation of catalytic formulations, object of the present invention, comprises the formulation and modification of support based on alumina, its formulation on cylindrical, trilobular or tetralobular extrudates and modification with an inorganic oxide, such as silicon oxide, titanium oxide, zirconium oxide, magnesium oxide, etc. For said formulation, an alumina precursor is selected, which can be boehmite, pseudoboehmite, bayerite, gibbsite, etc. First, alumina precursor is milled and sieved to obtain particles of uniform size (<150 μm), sieving them through a sieve 100 U.S. mesh. For performing the alumina peptization an aqueous solution of inorganic or organic acid such as nitric acid, hydrochloric acid, phosphoric acid, boric acid, sulfuric acid, citric acid, acetic acid, etc. is added. Preferably, phosphoric acid, citric acid, nitric acid or acetic acid at a diluted concentration of <5% volume, these components are mixed into a kneader type Muller, Bench Kneader, Mod. PNV-1, to obtain a malleable and perfectly homogeneous and uniform paste, with the appropriate rheological properties to be extruded. Later, the paste is extruded in an equipment DOTCO, Mod. BA-293 with compressed air at a pressure of between 800 and 1500 kPa, in which formulate the cylindrical, trilobular, or tetralobular extrudates with average diameter between 1.2 and 3.2 mm. The extrudates are allowed to stand at room temperature (25° C.) between 8 and 24 h, subsequently submitted to a process of drying in a convection oven, first at a temperature between 40 and 60° C. during 4 h, then increases to a temperature between 60 and 80° C. during 5 h, subsequently increases the temperature between 100 and 120° C. during 15 h. Finally, the hydrated alumina extrudates are subjected to a calcination process, in which they are thermally treated in a dynamic atmosphere of air at temperature between 450 and 750° C. X-ray analyses show that the crystal phase of the material constituting the extrudates after calcination corresponds to the gamma-alumina phase, with a specific surface area of between 200 and 400 $m^2/g$ measured by BET method, a pore volume exceeding 0.5 $cm^3/g$ and average pore diameter of between 7 and 15 nm, measured by nitrogen physisorption.

Subsequently, the extrudates are subjected to a treatment of surface modification, in order to passivate the basic hydroxyl groups and prevent their interaction with the metal components of the active phases in the catalytic formulations, which is done through the incorporation of inorganic oxides, such as zirconium oxide, silicon oxide, titanium oxide, magnesium oxide, etc.

Treatment consists of contacting the calcined extrudates with gamma-alumina phase with a solution containing an organometallic precursor intended to be impregnated at room temperature (25° C.). The solution containing the organometallic (ORGMe) precursor is prepared by the sol-gel method, in which the organic component of the precursor intended to be impregnated is dissolved in a protic polar solvent in a ORGMe/solvent molar ratio from 20 to 80. Deionized water is used for the hydrolysis of the organometallic compound, at a water/ORGMe molar ratio between 0.1 and 1 and an inorganic acid as hydrolysis catalyst, which can be hydrochloric acid, nitric acid, sulfuric acid or phosphoric acid, at an acid/ORGMe molar ratio between 0.01 and 0.2. Once added all the components to the solution containing organometallic precursor of inorganic oxide the mixture is subjected or not to heat digestion process which consists in reflux at temperature between 25 and 80° C. for a period of 0 to 8 h and finally, contacting the dry extrudates of gamma-alumina with the solution and let it rest for a period of time from 1 to 24 h, filtering, and drying the impregnated extrudates at temperature between 80 and 120° C. for a period of time between 15 and 24 h. Finally, the extrudates are calcined in air dynamic atmosphere at a temperature between 350 and 500° C. for a period of time of 4 to 24 hours. The final Me composition modifying the surface extrudate of alumina is between 2.0 and 15% by weight. Final oxide possesses specific surface area between 250 and 350 $m^2/g$ measured by BET method, pore volume between 0.5 and 1.2 $cm^3/g$ and pore diameter between 7 and 12 nm. The compounds that can be used as inorganic oxide precursors can be ethoxide, propoxide or isopropoxide or butoxide of metals, tetreetoxide, specifically tetraethyl orthosilicate, titanium isopropoxide or zirconium butoxide or magnesium ethoxide. The protic solvent can be a low molecular weight alcohol, such as ethanol, propanol, iso-propanol and/or n-butanol or iso-butanol.

Optionally, the incorporation of an inorganic oxide, as such titanium oxide, magnesium oxide, silicon oxide, zirconium oxide, etc. can be performed in alumina precursor or alumina activated in powder form, in order to achieve a more homogenous inorganic oxide dispersion on the surface of the support, for subsequently, carry out the extrusion procedure. In this case, the procedure consist of contacting alumina powder, boehmite, gibbsite, bayerite precursor, etc., or activated alumina, previously calcined and sieved at mesh greater than 100, with a solution containing a organometallic oxide precursor intended to be impregnated at room temperature (25° C.), in a solution volume/alumina mass ratio within between 10 and 40. The solution containing the organometallic precursor prepared by sol-gel method, in which the organic component of the oxide precursor intended to be impregnated, is dissolved in a protic polar solvent al ORGMe/solvent molar ratio from 20 to 80. For the hydrolysis of the organometallic compound, deionized water is used at water/ORGMe molar ratio between 0.1 and 1 molar and an inorganic acid as hydrolysis catalyst, which can be hydrochloric acid, nitric acid, sulfuric acid or phosphoric acid, at acid/ORGMe molar ratio between 0.01 and 0.2. Once all components are added to the solution containing inorganic oxide organometallic precursor, undergoes or not thermal digestion process which consists of reflux at temperature between 50 and 80° C. for a period of 1 to 8 h. Finally, after contacting solution containing the inorganic oxide organometallic precursor with material in the powder form of alumina precursor or activated alumina previously calcined, the resulting material is allowed to stay for a period of 1 to 24 h, filtered and dried at temperature between 80 and 120° C., for a period between 15 and 24 h. Subsequently, the extrusion procedure is performed by adding an inorganic or organic acid aqueous solution such as nitric acid, hydrochloric acid, phosphoric acid, boric acid, sulfuric acid, citric acid, acetic acid, etc. Preferably, phosphoric acid, citric acid, nitric acid or acetic acid in a diluted concentration at <5% volume, these components are mixed into a Muller type kneader, Bench Kneader, Mod. PNV-1, to obtain a malleable and perfectly homogeneous and uniform paste, with rheological properties suitable to extrusion. Afterwards, the paste is extruded in a DOTCO, Mod. BA-293 equipment with compressed air at a pressure of between 800 and 1500 kPa, in which the cylindrical, trilobular or tetralobular extrudates are formulated with average diameter in between 1.2 and 3.2 mm. The extrudates are allowed to stay at room temperature (25° C.) between 8 and 24 h, then they are subjected to a drying process in a convection oven, first at a temperature between 40 and 60° C. during 4 h, then increases to a temperature between 60 and 80° C. for 5 h, and finally increases to a temperature between 100 and 120° C. during 15 h. Finally, the alumina extrudates modified with an inorganic oxide, are calcined by a heat treatment in dynamic air atmosphere at temperatures between 450 and 750° C. X-ray analyses show that the crystalline phase obtained from the extrudates after calcination corresponds to the gamma-alumina phase with a specific surface area included between 200 and 400 $m^2/g$ measured by BET method, pore volume over 0.5 $cm^3/g$ and average pore diameter between 7 and 15 nm, measured by nitrogen physisorption.

To obtain the catalytic formulation, object of the present invention, the support modified or not with an inorganic oxide is contacted with an impregnating solution comprising at least one metal component of Group VI B and at least one component of Group VIII B and an inorganic acid which can be boric acid, phosphoric acid o sulfuric acid. Impregnating solution, prepared by thermal digestion of an aqueous solution which consists of refluxing at least one oxide or a precursor salt of oxide of a metal from Group VI B, which can be Mo, W and/or Cr or a mixture thereof, preferably mixed with an inorganic acid, preferably phosphoric acid at temperature between 60 and 100° C. with vigorous stirring for a period between 6 and 24 h, until a transparent solution is formed. The metallic component precursor of Group VI B can be selected from a group of water soluble salts such as ammonium salts, ammonium heptamolybdate or metatungstate, sodium molybdate and tungstate, tungsten or molybdenum oxide, preferably molybdenum salts. Optionally, an organic compound containing one or more hydroxyl or carboxyl groups in its structure, that could or not contain sulfur, can be added at this stage. It could be glycolic acid, thioglycolic acid, malic acid, citric acid, sucrose, etc., in a concentration that allows obtaining a molar ratio of organic compound/Group VI B and VIII B metals between 0.1 and 1. At that time a charge-transfer complex ligand-metal is formed, occurring transfer of electrons from the organic ligand to metallic d orbitals, preferably to the d orbital d of molybdenum and the solution changes from transparent yellow to dark blue.

Finally, the precursor of the second metal component from Group VIII B can be added, which can be nitrate, chloride, acetate, carbonate, hydroxycarbonate of at least one non-noble metal from Group VIII B of the periodic table, preferably Fe, Ni or Co or mixture thereof. Heating is continued by a period between 1 and 6 h. Optionally, the organic compound containing one or more hydroxyl or carboxyl groups in its structure, which may or may not contain sulfur can be added at this stage. It may be glycolic acid, thioglycolic acid, malic acid, citric acid, sucrose, etc. In a concentration that allows obtaining a Group VI B and VIII B composite organic/metals molar ratio between 0.1 and 1, to form in that moment the charge-transfer complex with the metal of Group VI B, preferably molybdenum. Finally, the solution is concentrated through controlled evaporation to a volume determined by the support pore volume, enabling the impregnation by incipient wetting. Once wet, modified alumina support with inorganic oxide, with impregnation solution, is left aging for a period between 4 and 24 h and then dried at temperatures between 60 and 120° C. for a period of 8 to 24 hours. If the impregnation was performed by adding the organic compound in the impregnating solution, the catalytic formulation does not require a calcination process and goes through directly to its by sulfiding process. If impregnation is carried out without the incorporation of organic additive in impregnating solution, the catalytic formulation is calcined at temperatures between 300 and 600° C. for a period between 2 and 12 h in air dynamic atmosphere, feeding an air flow of 20 to 150 $cm^3$/min through the extrudates of the catalytic formulation.

When the catalytic formulation it is prepared without the addition of the organic compound in the impregnating solution, active components interact with the support modified with an inorganic oxide during the calcination and high dispersion is obtained thereof on the support surface, and it is preference of the present invention, to add an organic compound containing one or more hydroxyl or carboxyl groups in its structure, and that contains or not sulfur by choosing glycolic acid, thioglycolic acid, malic acid, citric acid, sucrose, etc., once the active components are dispersed homogeneously on the support surface in strong interaction with the surface thereof, which is originated by a calcination procedure. The incorporation of the organic component is made by impregnation method through incipient wetting with an aqueous solution of the organic component, at a concentration that allows a composite organic/active metals of Group VI B and VIII B molar ratio between 0.1 and 2. At such stage, the organic compound reacts with active components, metal elements of Group VI B and VIII B, weakening their interaction with the support and maintaining their dispersion on the surface thereof. In such stage a charge-transfer complex with metal of the Group VI B, preferably molybdenum is formed, observed color of the catalytic formulation changes; if the non-noble element of the Group VIII B is Ni, the material will change from green to blue, while if the element of Group VIII B is Fe or Co, the catalytic formulation changes from blue or reddish brown to dark brown. Finally, the catalytic formulation is subjected to a drying process at temperature included between 60 to 120° C. for a period of 2 to 24 h.

The content of the metal component of the element from Group VI B of the periodic table in the catalytic formulation, object of the present invention, specifically tungsten or molybdenum, is between 8 and 20% by weight, more specifically between 10 and 18% by weight. On the other hand, the content of non-noble metallic component of Group VIII B in the catalytic formulation, object of the present invention, falls between 2 to 8% by weight, more specifically between 2.5 and 6% by weight. The percentage by weight is related to the total weight of the catalytic formulation. The metallic ratio at which the metallic components are in the catalytic formulation, object of the invention, metals of Group VIII B/Group VI B, is included between 0.1 and 1.0, more specifically between 0.2 and 0.6.

Optionally, the catalytic formulation, object of the present invention, may contain a component from Group V A of the periodic table. Preferably, the compound of element from Group V A includes phosphorus and, more preferably, $P_2O_5$. In the examples of the present invention, phosphoric acid was used during the preparation process of the impregnation solution, to form $P_2O_5$ in the final catalytic formulation. The addition of this compound helps to reduce the interaction of the metal components of the active phase with an inorganic oxide-modified support and so achieve optimal dispersion of the active compounds in support. The content of the component in from Group V A in the catalytic formulation, object of the present invention, is between 1 and 8% by weight, specifically between 2 and 6% by weight. The percentage by weight is relative to the total weight of all components in the catalytic formulation.

Catalytic formulation, object of the present invention, contains an organic compound with one or more hydroxyl or carboxyl groups in its structure, and which may or may not contain sulfur, being glycolic acid, thioglycolic acid, malic acid, citric acid, sucrose, etc. In the case in which the organic compound impregnated to the catalytic formulation, contains sulfur in its composition, the sulfur concentration in the catalytic formulation must be between 1% and 8% weight, specifically between 2 and 5% by weight.

The activation of the catalytic formulations consist of sulfiding the metal species, converting them to sulfided metal species, which are the active species for the reactions of hydroprocessing, preferably, hydrodesulfurization and hydrodenitrogenation. Said process was carried out through the sulfidation procedures described below: If the catalytic formulation does not contain organic additive, some volume of the catalytic formulation is loaded in a fixed bed reactor, the hydrogen flow is adjusted to get a hydrogen/hydrocarbon ratio ranging between 850 to 1900 ft$^3$/bbl and the pressure of hydrogen is adjusted between 35 and 60 kg/cm$^2$. Then, the catalytic bed temperature is increased from room temperature (25° C.) up to 150 to 200° C., at a heating rate included between 20 and 50° C./h. Once reached said temperature and pressure in the system a liquid hydrocarbon fraction (specifically primary light gas-oil. PLG) doped with dimethyldisulfide (DMDS) is fed, in such a way that the total concentration of sulfur in this fraction is greater than 2.5% by weight. The flow of said hydrocarbon fraction is maintained at a speed that allows fixing the space velocity, LHSV (liquid hourly space velocity liquid) at a value between 1 and 2.5 h$^{-1}$. Flow is maintained for a period of time between 0.5 and 4 h and temperature is then increased to 250 and 270° C., at a heating rate of 10 to 30° C./h and the system is maintained at these conditions for 0.5 to 4 h. Then, the temperature is increased to a third stage of sulfidation, at a temperature between 270 and 300° C., at a heating rate of 10 to 30° C./h, these conditions being maintained for 0.5 to 8 h.

Once the sulfidation step is complete, the hydrogen flow is adjusted to get the hydrogen/hydrocarbon ratio required for the catalytic test (between 1500 and 3000 ft$^3$/bbl), operating pressure is adjusted between 40 and 80 kg/cm$^2$, the hydrocarbon fraction fed, PLG, is changed to the one to be desulfurized, LHSV is adjusted between 1 and 2.5 h$^{-1}$ and the system is brought to the catalytic test temperature (between 330 and 380° C.), at a heating rate between 3 and 10° C./h.

When the catalytic formulation includes an organic additive that has one or several hydroxyl or carboxyl groups in its structure, and which contains or not sulfur, selecting glycolic acid, thioglycolic acid, malic acid, citric acid, sucrose, the sulfidation process should not involve a heating step above 120° C., without before incorporating a liquid flow of hydrocarbon fraction containing DMDS, up to achieve a sulfur concentration over 2.5% by weight. Said procedure consists of adjusting the hydrogen flow to a hydrogen/hydrocarbon ratio from 850 to 2000 ft$^3$/bbl and adjusting the system pressure between 20 and 35 kg/cm$^2$. Introducing the liquid fraction of hydrocarbons, PLG, containing DMDS, at a flow rate which allow establish a space-velocity, LHSV, between 1 and 2 h$^{-1}$, and then the temperature is increased from room temperature (25° C.) up to 120 to 150° C., with a heating rate included between 30 and 50° C./h. It is essential for the activation procedure that the catalytic formulation, object of the present invention, must not be subjected to any heating procedure at temperatures above 100° C., without first contacting the catalytic formulation with any liquid fraction of hydrocarbons. Later, temperature is increased to between 250 and 280° C., with a heating rate between 10 and 30° C./h, stays at this condition for 1 to 8 h. Once again, temperature is increased to between 290 and 300° C. at a heating rate between 10 and 30° C./h, and the system is kept at this condition during 1 to 5 h. Finally, temperature is increased to between 330 and 350° C., at a heating rate between 10 and 30° C./h, and this conditions are maintained for 1-5 hours. Once the sulfiding stage finishes, the hydrogen flow is adjusted to the required hydrogen/hydrocarbon ratio for catalyst testing (between 1500 and 3000 ft$^3$/bbl), operating pressure is adjusted to between 40 and 80 kg/cm$^2$, the feed is changed to the hydrocarbon fraction, PLG, intended to be desulfurized, the LHSV is fixed between 1 and 2.5 h$^{-1}$ and system is brought to the testing temperature, between 330 and 380° C., at a heating rate of 3 to 10° C./h.

From the activation and/or sulfiding methodologies described above, object of the present invention, active components which are metal components of Group VI B and non-noble metal components of Group VIII B are transformed from their oxidized form to their sulfurous one, which are the active phases of the catalytic formulations in the hydrotreating process, preferably in reactions of hydrodesulfurization and hydrodenitrogenation. With the strategy of surface modification of alumina with an inorganic oxide, the interaction of the active components with the support is modulated to achieve a high dispersion of sulfurized active species. The addition of the organic additive modifier, preferably once active components have been dispersed over the support surface by calcining procedure, results in formation of a charge-transfer complex ligand-metal, occurring transfer of electrons from the organic ligand to metal orbital d, preferably to orbital d of the metal components of the Group VI B, which causes a partial reduction of those elements of Group VI B, preferably of molybdenum. Conjugation of both strategies, i.e., modification of support with an inorganic oxide and the addition of the organic compound in the preparation procedure of the catalytic formulations, causes that a greater amount of those species of the metal from Group VI B to be easily sulfided since temperatures below 400° C. In fact, the sulfidability of molybdenum increases during the activation process, between 85 and 95% of surface species determined by X ray photoelectron spectroscopy (XPS), and increases CoMoS or NiMoS o FeMoS, NiWS or CoWS type active sites, which consist of small stacked sheets of $MoS_2$ or $WS_2$ with the promoter atoms, Ni, Co or Fe located at the edges of these structures. Indeed, between 60 and 85% of the metal from Group VIII B is located at the edges of the stacked sheets of $MoS_2$ or $WS_2$ (determined by XPS). When the metallic components are deposited on unmodified alumina support, the sulfidability of the element of the Group VI B, preferably Mo, is lesser to 70%; while the formation of NiMoS or CoMo or FeMoS or NiWS or CoWS type structures does not exceed 60%. Given that activity in hydrodesulfurization and hydrodenitrogenation reactions has been attributed to the NiMoS or CoMoS type structures, the generation of greater amount of said structures on the support surface modified with organic oxide and addition of an inorganic compound enhances the performance of the catalytic formulations in hydrotreating processes.

Additionally, the metal sulfides nanoclusters of Group VI B, $MoS_2$ or $WS_2$, existing on modified supports, present morphologies of stacked sheets, with a stacking level between 4 and 8 sheets, which are promoted by a non-noble element of Group VIII B, located on the edges of said stacked sheets, which are known as type II sites, see FIGS. 1a and 1b. The nanoclusters containing sulfides of metals from Group VI B promoted with non-noble metals of Group VIII B, present dimensions of 3-8 nm in length with stacks of 2 to 8 sheets. Comparatively, when the active component are deposited on a support of alumina unmodified with inorganic oxide and without added organic compound, particles with one or two stacks and length of 5 to 30 nm are obtained, see FIG. 1c, these sulfide monolayers of $MoS_2$ or $WS_2$ promoted at the edges with an element of Group VII B, Co, Ni or Fe, known as type I sites, and it has been reported that are less active in hydrotreating reactions than type II sites, with higher stacking level.

The addition of an organic compound in a support of alumina unmodified with inorganic oxide, also changes the morphology of the metal sulfide nanoclusters of Group VI B, promoted with non-noble metal of Group VIII B. Said nanoclusters become shorter and with greater stacking level, have dimensions between 5 and 10 nm with stacks of 2 to 8 sheets, see FIG. 1d. The effect of the organic compound is to weaken the interaction with the support and allow more stacked sheets of metal sulfides of Group VI B and the generation of more sites promoted with non-noble metal of Group VIII B. More specifically, the CoMoS or NiMoS sites known as type I are transformed to type II sites, showing increased activity in hydrotreating reactions.

The present invention is aimed to be used in catalytic formulations in the hydrotreating process for obtaining fuels with ultra low sulfur content, specifically ultra low sulfur diesel, from oil hydrocarbons fractions whose boiling temperatures fall between 180° C. and 450° C., with initial S content between 1.0 and 5.0% by weight and initial content of nitrogen between 200 and 600 ppm. For this purpose, ultra low sulfur diesel (ULSD) is defined as the product obtained after the hydrotreating process with final content of less than 15 ppm sulfur.

The performance of the catalytic formulations was tested in a reaction plant with fixed bed reactor with three different gas-oil as feedstocks, and gas-oil mixtures and light cycle oil or coker gas oil. The operating conditions at which the tests were carried out varied depending on the metal content of the catalytic formulation and gas-oil or gas-oil mixture used in said tests and fall between a temperature of 330 to 370° C., LHSV between 1.0 and 2.5 h$^{-1}$, hydrogen pressure between 50 and 80 kg/cm$^2$ and hydrocarbon/hydrogen ratio between 2000 and 3000 ft$^3$/bbl.

The properties of feedstocks used in catalytic tests are presented in Table 3. Final and initial boiling temperatures are between 240 and 360° C., between 1.7 and 2.5% by weight of sulfur content and nitrogen content between 200 and 500 ppm and aromatic content over 30% by weight.

The sulfur concentration in the feedstocks (high sulfur concentrations) was determined by applying the ASTM D-4294 method in a X-ray equipment, Oriba brand model SLSA 800. The sulfur concentration in the product (concentrations of less than 100 ppm S) was determined by applying the ASTM D-5453 method in equipment ANTEK 9000 and confirmed by applying the ASTM D-7039 method, in an X-ray fluorescence spectrophotometer with dispersive monochromatic wavelength Model SINDIE. The nitrogen concentration was determined by applying the ASTM D-4629 method in equipment ANTEK 9000 in feedstocks and products.

From the examples shown in the present invention, it is possible to establish that the incorporation of an organic compound in an support of alumina unmodified with inorganic oxide increases the density of active sites, since the sulfur content in the diesel product decreases from 407 ppm S, when no organic agent is added, to about 100 ppm S, adding the organic additive modifier either in the impregnation solution or once active components have been dispersed on the support surface by calcination procedure, see Table 4. It is also possible to establish that the effect of the organic compound is greater when it is added on the metallic components that have been dispersed on the support of alumina modified with an inorganic oxide since the sulfur concentration in the product decreased up to 48.4 ppm S, see catalytic formulation B8 in Table 5. By adjusting the operation conditions, specifically LHSV at 1 h$^{-1}$ or by increasing the concentration of active components on the support surface either without modifying or modified with an inorganic oxide, it can be established that the catalytic formulations are capable of obtaining ULSD, through the incorporation of an organic additive forming charge-transfer complex ligand-metal with elements of the Group VI B, weakening metal-support interaction and allowing the generation of a higher active sites density.

In the same way, from the presented examples it can be established that it is possible to increase the metal compound concentration on the surface support maintaining high dispersion thereof, since the catalytic formulations with concentrations of active components between 14 and 17% by weight can obtain ULSD at LHSV between 1.0 and 1.3 $h^{-1}$, active components concentrations between 17 and 20% by weight can obtain ULSD at LHSV of 1.5 $h^{-1}$ and metal components concentration including between 20 and 24% by weight can obtain ULSD at LHSV equal to 1.75 $h^{-1}$, keeping constant the rest of operating conditions and with a feedstock of 1.79% by weight sulfur and 257 ppm nitrogen, see Table 6, formulations with nickel, and Table 7, formulations with cobalt. Also it is possible to reduce the operation temperature at values lower to 350° C., keeping constant the LHSV at 1.5 $h^{-1}$.

It is shown from the examples presented in Table 9, that the catalytic formulations are capable of obtaining ULSD from gas-oil mixtures with a cyclic light oil concentration comprised between 5 and 30% volume, at LHSV between 1 and 1.5 $h^{-1}$ and temperature between 340 and 360° C. With addition of cyclic light oil, the sulfur concentration in the feed mixture is increased while maintaining its capacity to obtain ULSD.

In the examples in the present invention catalytic formulations with high hydrogenating capacity were obtained when the promoter element of the Group VIII B of the periodic table is nickel, and catalytic formulations with high desulfurizing capability when the promoter element of the Group VIII B of the periodic table is cobalt. Through proper mixing of both catalytic formulations along the reactor, it is possible to improve the catalytic performance, reducing the sulfur content in diesel product. Preferably, the formulation with high hydrogenating capability must be at the middle or at the bottom of the reactor, to improve its performance, because if the NiMoS formulation is placed at the top of the CoMoS formulation, a diesel product of 16 ppm sulfur is obtained, while if the CoMoS formulation is located at the top whereas the NiMoS one at the bottom a diesel product with 8 ppm sulfur is produced at temperature of 350° C. and LHSV of 1.5 $h^{-1}$. That indicated that the appropriate combination of formulations impact on obtaining ULSD.

EXAMPLES

Below are some examples related to catalytic formulations, object of the present invention described above, without limiting the scope of the invention.

Example 1

Preparation of Extruded Support on
Gamma-Alumina Phase

Supports of gamma-$Al_2O_3$ made in extrudates were obtained from an alumina hydrated precursor (commercial boehmite), for which the boehmite powder material were dried a 110° C. during 20 h, sieved using a 100 U.S. mesh, with opening of 0.149 mm, to homogenize the particle size. 500 g of powder material in boehmite were used to formulate the extrudates, which were placed in a mixer (Bench Kneader, Mod. PNV-1). 100 ml solution of $HNO_3/H_2O$ at 1% mol, were slowly added over a period of 2.5 h, without interrupting the mixing, forming a boehmite paste of uniform consistency and at the same time malleable, this paste was introduced in an extruder (DOTCO, Mod. BA-293), using compressed air at a pressure of 1,100 kPa, the obtained extrudates were cylindrical and trilobular form and $\frac{1}{16}$" in diameter. Said extrudates were left to stand at room temperature (25° C.) for a period of time between 18 and 24 h; subsequently, they underwent a drying process in a convection oven, first at a temperature of 60° C. for 4 hours, then the temperature was increased to 80° C. for 5 h, and, finally, temperature was increased to 120° C. for 15 h. For the calcination of the extrudates a heating ramp of 5° C./min up was employed to the temperature of 550° C. remaining at these conditions for 4 h under air flow of 150 ml/min. X ray analyses show that the crystalline phase obtained from the extrudates after calcination corresponds to the gamma-alumina phase. The textural properties of this support A1 showed a specific surface area of 300 $m^2g$, pore volume of 0.74 $cm^3/g$ and average pore diameter of 9.9 nm.

Example 2

Preparation of Extruded Support in
Gamma-Alumina Phase Modified with Silica in
Accordance with the Invention To prepare the support A2, the support A1 was employed in the extrudate formulation prepared as described in Example 1. Subsequently, this support A1 in the form of extrudate and calcined is left on the stove a 120° C., said support was changed following several steps to obtain 5% by weight of $SiO_2$ on the support. The modification steps of the support are as follow:

In a triple-neck round bottom flask of 3-liter capacity anhydrous ethanol with the $SiO_2$ precursor tetraethylorthosilicate (TEOS, $SiC_8H_{20}O_4$) were mixed, using magnetic stirring. Subsequently, the temperature of the flask was rised up to 70° C. and the system was held in reflux for 1 hour and then cooled down to 25° C. Once this temperature is achieved, the hydrolysis of metal alkoxide was carried out adding drop-wise a mixture of anhydrous ethanol, water and nitric acid, with $H_2O$/TEOS molar ratio=4, ethanol/TEOS=40 and $HNO_3$/TEOS=0.1.

After adding the hydrolysis solution stirring was kept for 30 min at room temperature (25° C.). Subsequently, alumina support already extruded (trilobular morphology) previously activated on stove at 120° C. was added. The material was then left at rest during 12 h at room temperature. Then, the modified support was submitted to filtration and then to drying the extrudates at 120° C. during a period of 18 h. Finally, the extrudates are calcined under dynamic air atmosphere at 400° C. for a period of 6 h. The final extruded support composition in gamma-alumina phase modified with silica was; O=48.39% by weight, Al=48.06% by weight and Si=3.55% by weight, and its textural properties showed a specific surface area of 275 $m^2/g$, pore volume of 0.61 $cm^3/g$ and pore diameter of 8.9 nm.

Example 3

Preparation of the Impregnating Solution

Impregnating solution was prepared by the method of thermal digestion (at ~80° C. under vigorous stirring) dissolving molybdenum trioxide, $MoO_3$, in distilled water and phosphoric acid $H_3PO_4$ at ~80° C. with vigorous stirring. Once $MoO_3$ has been dissolved the solution turns to transparent yellow, an organic compound is added or not and subsequently hydroxycarbonate nickel ($2NiCO_3.3Ni(OH)_2.4H_2O$) or cobalt acetate (($CH_3CO_2$)$2Co.4H_2O$) are added and heating is continued under stirring for 2 h. Later, the solution is concentrated at an adequate volume to be used in the impregnation of the support by pore filling. The amount of salt that is dissolved varies depending on the metal concentration that is desired in the final solid keeping Ni(Co)/(Ni(Co)+Mo) molar ratio=0.3 and $P_2O_5$/O($MoO_3$+NiO(CoO)) molar ratio=0.17.

Example 4

Preparation of the Comparative Catalytic Formulation B1 not in Accordance with the Invention A comparative catalytic formulation was obtained by impregnating the solution prepared in the Example 3, without the addition of organic compound. A gamma-alumina support A1 was prepared as described in the Example 1. Impregnation was carried out by incipient wetness, after impregnation the material is left aging for 18 h, then dried at 120° C., calcination was performed in static atmosphere using a ramp of 2° C./min up to 120° C. where the material stayed for 1 h and later temperature was increased with the same ramp of 2° C./min up to 400° C. staying at these conditions for a period of 4 hours. The textural properties of the catalytic formulation were specific surface area of 231 m$^2$/g, pore volume of 0.51 cm$^3$/g and average pore diameter of 8.9 nm. Finally, the metal content therein the catalytic formulation called B1 was of 11.59% by weight molybdenum and 3.82% by weight nickel.

Example 5

Preparation of the Catalytic Formulation B2 According to the Invention

A catalytic formulation was obtained adding thioglycolic acid (ATG) ($C_2H_4O_2S$) in the impregnating solution prepared as described in the Example 3, and impregnated on a gamma-alumina support A1, as described in Example 1. The impregnation was carried out by incipient wetness, after impregnation the material was left aging for 18 h, then dried at 120° C. for 18 h. Finally, the metal content therein the so-called catalytic formulation B2 was of 12.02% by weight molybdenum and 3.88% by weight nickel. ATG/Mo molar ratio was 0.6.

Example 6

Preparation of the Catalytic Formulation B3 According to the Invention

A catalytic formulation was obtained adding sucrose ($C_{12}H_{12}O_{11}$) in the impregnating solution prepared as is described in the Example 3, impregnated on gamma-alumina support A1 prepared as described in the Example 1. Impregnation was carried out by incipient wetness, after impregnation the material was left aging for 18 h, then dried at 120° C. for 18 h, finally the metal content in catalytic formulation known as B2 was of 10.84% by weight molybdenum and 3.46% by weight nickel. The sacarose/Mo molar ratio was 0.5.

Example 7

Preparation of the Catalytic Formulation B4 According to the Invention

One catalytic formulation was obtained adding malic acid ($C_4H_6O_5$) in the impregnating solution prepared as described in the Example 3, and impregnated on a gamma-alumina support A1 prepared as described in the Example 1. Impregnation was carried out by incipient wetness, after impregnating the material is left aging for 18 h, then it is dried at 120° C. for 18 h. Finally, the metal content in this catalytic formulation, known as B2, was 10.19% by weight molybdenum and 3.37% by weight nickel. The malic acid/Mo molar ratio was 0.5.

Example 8

Preparation of the Catalytic Formulation B5 According to the Invention

To the catalytic formulation B1 prepared according to the procedure described in Example 4, an aqueous solution containing thioglycolic acid at ATG/Mo ratio=0.6 was impregnated. Subsequently, the catalytic formulation was dried at temperature range of 50 to 120° C. for a period of 15-24 h. The catalytic formulation presented a final metal composition of 12.5% by weight molybdenum and 4.17% by weight nickel. This catalytic formulation was called B5.

Example 9

Preparation of the Comparative Catalytic Formulation B6 not According to the Invention A catalytic formulation was obtained by means of the impregnating solution prepared in Example 3, without the organic compound addition, to a gamma-alumina support modified with silica A2 prepared as it is described in Example 2. The impregnation was carried out by incipient wetness, after impregnation the material was let aging for 18 h, then it was dried at 120° C., the calcination was carried out in static air atmosphere using a ramp of 2° C./min to 120° C. where it remained for 1 h, the temperature being increased with the same ramp of 2° C./min to 400° C., these conditions were kept by a period of 4 h. The textural properties of the catalytic formulation were specific surface area of 231 m$^2$/g, pore volume of 0.51 cm$^3$/g and average pore diameter of 8.9 nm. Finally, the metal content in the catalytic formulation called B6 was 15.36% by weight molybdenum and 4.77% by weight nickel.

Example 10

Preparation of the Catalytic Formulation B7 According to the Invention

To the catalytic formulation B1 prepared according to the procedure described in Example 4, an aqueous solution containing thioglycolic acid was impregnated at ATG/Mo ratio=0.6. Subsequently, the catalytic formulation was dried at temperature of 80° C. for a period of time of 18 h. The catalytic formulation presented a final metal composition of 15.06% by weight molybdenum and 5.15% by weight nickel. This catalytic formulation was called B7.

Examples 11, 12, 13 and 14

Preparation of the Catalytic Formulations B8, B9, B10 and B11

In order to evaluate the effect of varying the concentration of active components in the catalytic formulations, four catalytic formulations were prepared by varying the metal concentration dispersed on the gamma-alumina support A2 modified with silica, as described in the Example 9, and modified with organic compound following the procedure described in the Example 10. The final concentration of metals in catalytic formulation B8 was 11.98% by weight molybdenum and 3.69% by weight nickel. The final metal concentration in catalytic formulation B9 was 13.01% by weight molybdenum and 3.66% by weight nickel. The final metal concentration in catalytic formulation B10 was 13.36% by weight molybdenum and 3.85% by weight nickel and the final metal concentration in catalytic formulation B11 was 18.1% by weight molybdenum and 4.5% by weight nickel.

Examples 15 & 16

Preparation of Catalytic Formulations B12 and B13

Two catalytic formulations were prepared by varying the metal composition and following the procedure described in the Example 9 and using cobalt acetate in the preparation of the impregnating solution, using the procedure described in the Example 3. The modification with organic compound was performed following the procedure described in the Example 10. With the addition of the organic compound, color of the catalytic formulation changed from pink to dark brown. The final metal concentration in catalytic formulation B12 was 12.25% by weight molybdenum and 3.66% by weight cobalt. The final metal concentration in catalytic formulation B13 was 13.26% by weight molybdenum and 4.35% by weight cobalt.

Example 17

Effect of the Incorporation of an Organic Additive in an Alumina Support

In order to establish the influence of the addition of the organic compound on catalytic performance of the synthesized catalytic formulations B1-B8 in the above examples, the corresponding catalytic formulations were tested in the hydrodesulfurization of oil hydrocarbons fractions called primary light gas-oil, to obtain diesel with ultra low sulfur content. Features of gas-oils used were presented in the Table 1. Evaluation conditions are set at temperature of 350° C., pressure of 6.86 MPa, $H_2$/HC ratio of 2500 ft$^3$/bbl (cubic feet/processed gas-oil barrel), and LHSV ranged between 1.5 and 1.0 h$^{-1}$. Catalytic tests results are presented in Table 4. The comparative catalytic formulation B1, prepared on an in alumina support was tested at LHSV of 1.5 h$^{-1}$, decreasing the sulfur content in diesel product to 407 ppm starting from a gas-oil with 23000 ppm S and 450 ppm nitrogen. The addition of thioglycolic acid, sucrose, and malic acid (evaluation of the catalytic formulations B2, B3 and B4) in the impregnation solution enhanced the performance of the catalytic formulation decreasing the sulfur content in the product to 327, 113 and 90.8 ppm sulfur, respectively, and when LHSV was 1 h$^{-1}$, the sulfur content in diesel was 100, 34 and 10 ppm, respectively. The test of the catalytic formulation containing malic acid was carried out with a gas-oil with lower initial sulfur and nitrogen content, see Table 4. Catalytic test of the catalytic formulation B5 prepared according to the Example 8, allows to note that the addition of the organic compound, not in the impregnation solution but after metal components have been dispersed over the support surface, in this case of alumina, by a calcination process, forms a charge-transfer complex ligand-metal, there is transfer of electrons from organic complex towards the metal of Group VI B which partially reduced molybdenum, thus reducing its interaction with the support, which represents a favorable effect in obtaining of ULSD, as the sulfur content decreased from 407 to 101 ppm, compared with the catalytic formulation containing no organic compound and from 327 to 101 ppm compared with the catalytic formulation in which the organic was incorporated in the impregnating solution. By decreasing the LHSV to 1 h$^{-1}$, that catalytic formulation is capable to obtain ULSD with 14 ppm sulfur content, while when the organic compound was incorporated in the impregnation solution 100 ppm of sulfur in diesel product were obtained.

Example 18

Effect of the Modification of the Alumina Support with Silica and by Addition Organic Compound Catalytic formulations which were prepared on silica-modified supports were tested at the same conditions as in Example 17 and compared with the catalytic formulations that were prepared on unmodified alumina supports. The results are presented in Table 5. Using the catalytic formulation on a modified silica support improved even more the catalytic performance, at a LHSV of 1.5 h$^{-1}$ the catalytic formulation B5 prepared under the same procedure on an unmodified alumina support produced a diesel of 101 ppm sulfur, while which prepared on a modified silica support a diesel with 48.5 ppm sulfur is obtained, by decreasing the LHSV to 1 h$^{-1}$ ULSD was obtained over both catalytic formulations, however, sulfur content was lower, 8.9 ppm, by using the catalytic formulation B6, on the alumina support with silica, than that obtained with the catalytic formulation supported on unmodified alumina, in which case 14 ppm of S in product were obtained.

The effect of the incorporation of the thioglycolic acid on alumina support with silica can be seen in the tests of catalytic formulations B6 and B7. Without the addition of thioglycolic acid in the catalytic formulation B6, a diesel product of 17.4 ppm sulfur is obtained while when the organic acid is used in the formulation a diesel of 4 ppm sulfur is obtained at a LHSV of 1.5 h$^{-1}$, which indicates that the addition of an organic compound on a modified silica support also enhances the performance of the catalytic formulation.

Example 19

Effect of the Increase of the Metal Content in the Catalytic Formulations

In this example, the activity test of the catalytic formulations prepared in the Examples 10-14 was carried out in the hydrodesulfurization of a gas-oil with initial sulfur and nitrogen content of 17900 ppm and 257 ppm, respectively.

The tests were performed only by varying the LHSV and keeping other conditions similar to those in the Example 17. All the catalytic formulations were prepared on alumina support modified with an inorganic oxide and organic additive. The results are presented in Table 6. It can be observed that at concentrations of Ni and Mo between 15 and 17% by weight, catalytic formulations are capable of obtaining ULSD (<15 ppm S) at LHSV between 1 and 1.3 $h^{-1}$. With metal concentrations between 17 and 20% by weight of Ni and Mo ULSD was obtained at LHSV included between 1.3 and 1.5 $h^{-1}$, while at concentrations over 20% metal Ni+Mo ULSD can be obtained at LHSV greater than or equal to 1.75 $h^{-1}$ from used gas-oil. These examples give evidence that the supports modified with silica are able to disperse high concentrations of metals without aggregating on the materials surface avoiding loses in activity.

Example 20

Evaluation of the Catalytic Formulations CoMo B12 and B13

Catalytic test results of the formulations with CoMo active phase (B12 and B13) of the present invention are presented in Table 7. Evaluations were carried out by varying the LHSV and maintaining constant temperature, pressure and $H_2$/HC ratio, such as in the Example 17. The results were compared with those from one commercial catalytic formulation containing the same metal components as those of NiMo catalytic formulations object of the present invention. The catalytic formulation B12 containing 15.91% by weight of Co and Mo was able to obtain ULSD (concentration less than or equal to 15 ppm S) at LHSV between 1 and 1.3 $h^{-1}$, from a gas-oil with initial content of 17,900 ppm sulfur and 257 ppm nitrogen. At LHSV of 1.5 $h^{-1}$, diesel con 32 ppm sulfur was obtained, while with a NiMo-based catalytic formulation diesel of 21.2 ppm sulfur was obtained while over a commercial catalytic formulation containing CoMo the sulfur content of product diesel was 440 ppm S, as tested in presence of the same feedstock and under similar operating conditions. By slightly increasing the concentration of metal components Co and Mo to 17.61% by weight, catalytic formulation as B13, ULSD with 10 ppm sulfur is obtained at LHSV 1.5 $h^{-1}$, in presence of the same feedstock and under similar operating conditions than the commercial catalytic formulation with 22.52% by weight of Co and Mo, that produced diesel of 440 ppm sulfur. This suggests that the catalytic formulation B13 despite of having lower metal content maintains higher surface density of active sites.

The catalytic formulation B13, was also tested with a gas-oil with higher sulfur and nitrogen contents, 20,900 ppm and 369 ppm, respectively, by varying the operating temperature and LHSV. With said feedstock the B13 catalytic formulation catalytic was able to produce ULSD with sulfur content of 14 ppm S at 355° C., maintaining the LHSV at 1.5 $h^{-1}$. Decreasing LHSV and temperature to 1 $h^{-1}$ and 350° C. respectively, diesel with 7.7 ppm sulfur was obtained. Compared with catalytic formulation B11 (NiMo), with the greatest concentration of metallic phase, 4 ppm sulfur in the diesel product was obtained at 350° C. and LHSV 1.5 $h^{-1}$. This indicates that is possible improve the performance of CoMo catalytic formulations by increasing the metal content dispersed on the surface of the catalytic formulations.

Example 21

Effect of Temperature in the Evaluation of the Catalytic Formulation B11 with Feedstocks with Different S and N Content The catalytic formulation B11 prepared according to the procedure described in Example 14, was tested by varying the operating temperature from 335 to 350° C., with two different feedstocks with initial sulfur and nitrogen contents of 17900 and 20900 ppm S, and 257 and 369 ppm N, respectively. The results of the test are presented in Table 8, where it can be seen that from 345° C. the catalytic formulation can obtain ULSD, with sulfur content of 4.6 ppm, keeping constant the LHSV at 1.5 $h^{-1}$, pressure of 6.86 MPa kg/cm$^2$ and $H_2$/HC ratio of 2500 ft$^3$/bbl, from a gas-oil with initial content of sulfur of 17900 ppm and that of nitrogen of 257 ppm. If the temperature is increased to 350° C. ULSD with 2 ppm sulfur is obtained or either the LHSV can be increased to 1.75 $h^{-1}$, keeping the temperature at 350° C., conditions at which ULSD with 9 ppm S was obtained. When the sulfur and nitrogen content increases in feedstock, over the same catalytic formulation at 345° C., sulfur content in diesel product increased to 42 ppm, so it is necessary to increase the temperature to 350° C. to obtain ULSD of 4 ppm S. By increasing LHSV to 1.75 and 2.0 $h^{-1}$ the sulfur content in diesel product augmented to 16 and 66 ppm S, respectively, as shown in Table 8.

Example 22

Catalytic Test of Formulations with Mixtures of Gas-Oil (PLG+Light Cyclic Oil, LCO) (PLG+Coker Gas-Oil, CG)

The test of the two catalytic formulations B7 and B10 were light cycle oil and coker gas-oil were added forming a mixture with primary light gas-oil as feedstock gas-oil was conducted. Corresponding results are presented in Table 9. Over catalytic formulation B10, ULSD with 8.5 ppm S is obtained at LHSV of 1.3 $h^{-1}$ with the GPL without adding LCO. When 15% volume of LCO was incorporated the sulfur content of diesel product augmented to 15.8 ppm S and with 25% volume of 2 LCO went up to 17 ppm S. This indicates that the catalytic formulation can process up to 25% by volume of LCO keeping the sulfur content in the product in about 17 ppm S. On the other hand, when coker gas-oil was incorporated at 5% volume sulfur content in product augmented to 54 ppm S, indicating that with said feedstock the process requires greater operating severity, namely, increased temperature or decreased LHSV.

By slightly increasing the metal loading in catalytic formulation B7, a better performance of the catalytic formulation could be seen, since it is possible to increase the LHSV to 1.5 $h^{-1}$ maintaining 4 ppm of sulfur content in the product, while by adding 5 to 15% volume of LCO sulfur content is increased to 4.8 and 13.4 ppm S, respectively.

This example demonstrates that the catalytic formulations developed are capable of obtaining ULSD with sulfur content less than 15 ppm S from mixtures of gas-oils.

Example 23

Evaluation of Catalytic Formulations in Stacked Catalytic Beds

Two catalytic formulations developed by mixing catalytic functions along the reactor were tested. Two desulfurizing (catalytic formulation B13, active phase CoMo) and hydrogenating (catalytic formulation B11, active phase NiMo) functions were mixed. Corresponding results are presented in Table 10. Independent tests of catalytic formulations, without combining, indicates that over catalytic formulation B13 with a metal concentration of 17.6% by weight of Co and Mo, a diesel with 47 ppm sulfur was obtained while with catalytic formulation B11, with metal concentration of 22.6% by 2 weight, the sulfur concentration in the product was 4 ppm S. By combining the two catalytic formulations along the reactor, placing the hydrogenating catalytic formulation, B11, at the top and the desulfurizing catalytic formulation, B13, at the bottom, the sulfur concentration in diesel that is obtained was 16 ppm S. While when first locating at the top the desulfurizing function, B13, and then placing the catalytic formulation with hydrogenating function, B11, at the bottom, a product with 8 ppm sulfur is obtained at 350° C. and LHSV of 1.5 h$^{-1}$. Comparing the results obtained at different temperature and LHSV presented in Table 10, it is possible to establish that the best strategy for combining catalytic beds is placing the catalyst with high desulfurizating function at the top, to eliminate the more reactive sulfur compounds, such as benzothiophenes and dibenzothiophenes and then locate the hydrogenating function at the reactor bottom to remove the most difficult nitrogen and sulfur compounds, as alkylated dibenzothiophenes, from the family of 4,6-dimethyl-di-benzothiophenes.

Example 24

Evaluation of Catalytic Formulations in Combination of Catalytic Beds Processing Mixtures of Primary Light Gas Oil and Light Cycle Oil In this example the test of Example 20 was replicated, in a pilot plant of greater capacity, locating 250 ml of catalytic formulation, B13 at the top of the reactor and 250 ml of catalytic formulation B11 at the bottom of the system. The test was carried out with primary light gas-oil and light cycle oil. The results are presented in Table 11. In this example, with stacked catalytic beds, B13 and B11, a diesel product of 15.6 ppm sulfur was obtained at LHSV of 1.5 h$^{-1}$, this parameter was adjusted to 1.3 h$^{-1}$, to bring the diesel product below 15 ppm S, the corresponding value being 10.5 ppm S. LCO content in the feedstock was increased from 5, 10, 15 to 20% volume and diesel product of 11.3, 13.1, 16.9 and 18.3 ppm S was obtained. From the results of this example, it is possible to obtain ULSD with sulfur content of less than 15 ppm S with gas-oil mixtures containing 10% by volume of LCO.

Example 25

The stability of catalytic formulations B11 and B13 in the combination of catalytic formulations tested in Example 20, was assessed through the analysis of the sulfur content in the product and the determination of the temperature required to reach 15 ppm of sulfur, applying the following kinetic expressions $$T_{req}(15\ ppm) = \frac{1}{1/T_{ear} + (R/Ea)*\ln(k_{cat}/k_{req})}$$

$$k_{req} = \frac{LHSV}{n-1} req \cdot (1/(S_{p,req})^{n-1} - 1/(S_f)^{n-1})$$

$$k_{cat} = \frac{LHSV}{n-1} cat \cdot (1/(S_{p,cat})^{n-1} - 1/(S_f)^{n-1})$$

Where:
n=reaction order
$S_p$=S concentration in the product
$S_f$=S concentration in feed
$E_a$=Apparent activation energy
R=Universal gas constant
Calculation of the reaction order $$k = \frac{LHSV}{(n-1)}\left(\frac{1}{S_p^{n-1}} - \frac{1}{S_f^{n-1}}\right)$$

Calculation of apparent activation energy through the linear form of the Arrhenius equation:

$$\ln k = -\frac{Ea}{R}\frac{1}{T} + \ln A$$

A reaction order of 1.45 and apparent activation energy around 130 kcal/mol were determined.

In FIG. 5 the temperature required to obtain 15 ppm S plotted versus the elapsed reaction time is presented, wherein it is possible to establish that the deactivation of the catalytic formulations is less than 0.5° C. per month in the two combinations of tested catalytic beds.

TABLE 3

Chemical analysis of the feestocks of primary light gas-oil (PLG) used for testing the catalytic formulations.

| Property/Feed (PLG) | PLG1 | PLG2 | PLG3 | LCO | AC | METHOD |
|---|---|---|---|---|---|---|
| TIE/° C. | 256.7 | 252.5 | 243.6 | 175 | 181.1 | ASTM D-86 |
| 10% | 278.8 | 276.5 | 282 | 244.1 | 202.7 | |
| 50% | 310.0 | 307.9 | 310.2 | 276.1 | 268.3 | ASTM D-86 |
| 90% | 342.6 | 339.7 | 340.4 | 311.9 | 338.4 | |
| TFE/° C. | 355.8 | 354.1 | 354.6 | 334.6 | 367 | ASTM D-86 |
| S. g. 20/4 (° C./° C.) | 0.8652 | 0.8844 | 0.8648 | 0.966 | 0.873 | ASTM D-4052 |
| S (wt %) | 2.3 | 1.79 | 2.09 | 3.647 | 3.17 | ASTM D-4294 |
| Total N (ppm) | 450 | 257 | 369 | 223 | 1032 | ASTM D-4629 |
| Total Aromatics (%p) | 34.1 | 32.1 | 30.2 | 80.8 | 39.8 | ASTM D-5186 |
| Monoaromatics (%p) | 27.1 | 20.1 | 21.3 | 13.5 | 33.8 | ASTM D-5186 |
| Diaromatics (%p) | 6.2 | 9.4 | 11.4 | 58.1 | 4.8 | ASTM D-5186 |
| Polyaromatics (%p) | 0.8 | 2.6 | 2.9 | 9.2 | 1.2 | ASTM D-5186 |

TABLE 3-continued

Chemical analysis of the feestocks of primary light gas-oil (PLG) used for testing the catalytic formulations.

| Property/Feed (PLG) | PLG1 | PLG2 | PLG3 | LCO | AC | METHOD |
|---|---|---|---|---|---|---|
| Bromine ($g_{Br}$/100 g) | 3.29 | 4.32 | 1.4 | 22.3 | 17.43 | ASTM D-1159 |
| Cetane index | 53.6 | 53.3 | 56.4 | | | ASTM D-4737 |

TABLE 4

Effect of organic additive type used in the preparation of the catalytic formulations

| | % by weight | | | | Feedstock PLG | | | Reaction conditions | | | | Diesel product | | |
|---|---|---|---|---|---|---|---|---|---|---|---|---|---|---|
| | | Additives | | | S | N | T | LHSV | $H_2$/HC | P | | S | N | |
| | Ni + Mo | P | Org. | Supp. | ppm | ppm | (°C.) | ($h^{-1}$) | $ft^3$/bbl | MPa | | ppm | ppm | Cat. |
| Comparative | 15.41 | 1.60 | 0 | A | 23,000 | 450 | 350 | 1.5 | 2,500 | 6.86 | | 407 | — | B1 |
| PI | 15.9 | 1.75 | TGA* | A | 23,000 | 450 | 350 | 1.5 | 2,500 | 6.86 | | 327 | 36.5 | B2 |
| PI | 15.9 | 1.75 | TGA* | A | 23,000 | 450 | 350 | 1 | 2,500 | 6.86 | | 100 | 3.4 | B2 |
| PI | 14.3 | 1.46 | SA* | A | 23,000 | 450 | 350 | 1.5 | 2,500 | 6.86 | | 113 | — | B3 |
| PI | 14.3 | 1.46 | SA* | A | 23,000 | 450 | 350 | 1 | 2,500 | 6.86 | | 34 | — | B3 |
| PI | 13.6 | 1.46 | MA* | A | 17,900 | 257 | 350 | 1.5 | 2,500 | 6.86 | | 91 | | B4 |
| PI | 13.6 | 1.46 | MA* | A | 17,900 | 257 | 350 | 1 | 2,500 | 6.86 | | 10 | <0.3 | B4 |
| PI | 16.68 | 2.1 | TGA | A | 23,000 | 450 | 350 | 1.5 | 2,500 | 6.86 | | 101 | — | B5 |
| PI | 16.68 | 2.1 | TGA | A | 23,000 | 450 | 350 | 1 | 2,500 | 6.86 | | 14 | <0.3 | B5 |

*Organic in impregnating solution TGA: Thioglycolic acid, PI: present invention P: phosphorus Sup.: Support S: sulfur MA: malic acid A: murine SA: Sucrose AS: alumina-silica Cat: catalyst

TABLE 5

Effect of organic additive and catalytic support, when using different feedstocks.

| | % by weight | | | | Feedstock PLG | | | Reaction conditions | | | | Diesel product | | |
|---|---|---|---|---|---|---|---|---|---|---|---|---|---|---|
| | | Additives | | | S | N | T | LHSV | $H_2$/HC | | | S | N | |
| | Ni + Mo | P | S | Supp. | ppm | ppm | (°C.) | ($h^{-1}$) | $ft^3$/bbl | MPa | | ppm | ppm | Cat. |
| Comparative | 15.41 | 1.60 | 0 | A | 23,000 | 450 | 350 | 1.5 | 2,500 | 6.86 | | 407 | — | B1 |
| PI | 16.68 | 2.00 | 2.4 | A | 23,000 | 450 | 350 | 1.5 | 2,500 | 6.86 | | 101 | — | B5 |
| PI | 16.68 | 2.00 | 2.4 | A | 23,000 | 450 | 350 | 1 | 2,500 | 6.86 | | 14 | <0.3 | B5 |
| PI | 15.79 | 2.24 | 2.74 | AS | 23,000 | 450 | 350 | 1.5 | 2,500 | 6.86 | | 48.5 | 0.4 | B8 |
| PI | 15.79 | 2.24 | 2.74 | AS | 23,000 | 450 | 350 | 1 | 2,500 | 6.86 | | 8.9 | <0.3 | B8 |
| PI | 20.13 | 2.33 | 0 | AS | 17,900 | 257 | 350 | 1.5 | 2,500 | 6.86 | | 17.4 | 0.79 | B6 |
| PI | 20.21 | 2.53 | 3.18 | AS | 17,900 | 257 | 350 | 1.5 | 2,500 | 6.86 | | 4 | 0.48 | B7 |

P: phosphorus S: sulfur PI: present invention A: alumina AS: alumina-silica

TABLE 6

Effect of the metal content in catalytic formulation.

| | % by weight | | | | Feedstock PLG | | | Reaction conditions | | | | Diesel product | | |
|---|---|---|---|---|---|---|---|---|---|---|---|---|---|---|
| | | Additives | | | ppm | ppm | T | LHSV | $H_2$/HC | P | | S | N | |
| | Ni + Mo | P | S | S | S | N | (°C.) | ($h^{-1}$) | $ft^3$/bbl | MPa | | ppm | ppm | Cat. |
| PI | 15.79 | 2.24 | 2.74 | AS | 17,900 | 257 | 350 | 1 | 2,500 | 6.86 | | 6.3 | <0.3 | B8 |
| PI | 16.67 | 2.14 | 1.9 | AS | 17,900 | 257 | 350 | 1 | 2,500 | 6.86 | | 6.7 | <0.3 | B9 |
| PI | 16.67 | 2.14 | 1.9 | AS | 17,900 | 257 | 350 | 1.3 | 2,500 | 6.86 | | 12.3 | <0.3 | B9 |
| PI | 16.67 | 2.14 | 1.8 | AS | 17,900 | 257 | 350 | 1.5 | 2,500 | 6.86 | | 21.2 | <0.3 | B9 |
| PI | 17.21 | 2.45 | 2.63 | AS | 17,900 | 257 | 350 | 1.3 | 2,500 | 6.86 | | 8.5 | <0.3 | B10 |
| PI | 20.21 | 2.53 | 3.18 | AS | 17,900 | 257 | 350 | 1.5 | 2,500 | 6.86 | | 4 | 0.48 | B7 |
| PI | 22.60 | 2.3 | 3.18 | AS | 17,900 | 257 | 350 | 1.5 | 2,500 | 6.86 | | 2 | <0.3 | B11 |
| PI | 22.60 | 2.3 | 3.18 | AS | 17,900 | 257 | 350 | 1.75 | 2,500 | 6.86 | | 9 | <0.3 | B11 |
| Comparative | 15.41 | 1.60 | 0 | A | 23,000 | 450 | 350 | 1.5 | 2,500 | 6.86 | | 407 | — | B1 |

P: phosphorus S: sulfur PI: present invention A: alumina AS: alumina-silica

TABLE 7

Effect of organic additive and different metal loading on PLG HDS.

| | % by weight | | | | Feedstock PLG | | Reaction conditions | | | | Diesel product | | |
|---|---|---|---|---|---|---|---|---|---|---|---|---|---|
| | | | Additives | | S | N | T | LHSV | H$_2$/HC | Pres. | S | N | |
| | Co + Mo | Ni + Mo | P | S | ppm | ppm | (° C.) | h$^{-1}$ | ft$^3$/bbl | MPa | ppm | ppm | Cat. |
| Comparative | 22.52 | — | 2.35 | 0 | 17,900 | 257 | 350 | 1.5 | 2,500 | 6.86 | 440 | 28 | B0 |
| PI | 15.91 | — | 2.11 | 2.25 | 17,900 | 257 | 350 | 1.5 | 2,500 | 6.86 | 32 | — | B12 |
| PI | 15.91 | — | 2.11 | 2.25 | 17,900 | 257 | 350 | 1.3 | 2,500 | 6.86 | 15 | — | B12 |
| PI | 15.91 | — | 2.11 | 2.25 | 17,900 | 257 | 350 | 1.0 | 2,500 | 6.86 | 6 | <0.3 | B12 |
| PI | 17.61 | — | 2.6 | 2.82 | 17,900 | 257 | 350 | 1.5 | 2,500 | 6.86 | 10 | <0.3 | B13 |
| PI | | 16.67 | 2.14 | 1.9 | 17,900 | 257 | 350 | 1.5 | 2,500 | 6.86 | 21.2 | <0.3 | B9 |
| PI | 17.61 | — | 2.6 | 2.82 | 20,900 | 369 | 345 | 1.5 | 2,500 | 6.86 | 183 | — | B13 |
| PI | 17.61 | — | 2.6 | 2.82 | 20,900 | 369 | 350 | 1.5 | 2,500 | 6.86 | 47 | — | B13 |
| PI | 17.61 | — | 2.6 | 2.82 | 20,900 | 369 | 355 | 1.5 | 2,500 | 6.86 | 14 | — | B13 |
| PI | 17.61 | — | 2.6 | 2.82 | 20,000 | 369 | 350 | 1.0 | 2,500 | 6.86 | 7.7 | 0.44 | B13 |
| PI | — | 22.6 | 2.3 | 3.18 | 20,900 | 369 | 350 | 1.5 | 2,500 | 6.86 | 4 | 0.42 | B11 |

P: Phosphorus S: sulfur PI: present invention

TABLE 8

Effect of reaction temperature with different load of PLG.

| | % by weight | | | Feedstock PLG | | Reaction conditions | | | | Diesel product | | |
|---|---|---|---|---|---|---|---|---|---|---|---|---|
| | | Additives | | S | N | T | LHSV | H$_2$/HC | Pres. | S | N | |
| | Ni + Mo | P | S | ppm | ppm | (° C.) | (h$^{-1}$) | ft$^3$/bbl | MPa | ppm | ppm | Cat. |
| PI | 22.6 | 2.3 | 3.18 | 17,900 | 257 | 335 | 1.5 | 2,500 | 6.86 | 187 | — | B11 |
| PI | 22.6 | 2.3 | 3.18 | 17,900 | 257 | 340 | 1.5 | 2,500 | 6.86 | 21 | — | B11 |
| PI | 22.6 | 2.3 | 3.18 | 17,900 | 257 | 345 | 1.5 | 2,500 | 6.86 | 4.6 | <0.3 | B11 |
| PI | 22.6 | 2.3 | 3.18 | 17,900 | 257 | 350 | 1.5 | 2,500 | 6.86 | 2 | <0.3 | B11 |
| PI | 22.6 | 2.3 | 3.18 | 17,900 | 257 | 350 | 1.75 | 2,500 | 6.86 | 9 | <0.3 | B11 |
| PI | 22.6 | 2.3 | 3.18 | 20,900 | 369 | 340 | 1.5 | 2,500 | 6.86 | 293 | — | B11 |
| PI | 22.6 | 2.3 | 3.18 | 20,900 | 369 | 345 | 1.5 | 2,500 | 6.86 | 42 | — | B11 |
| PI | 22.6 | 2.3 | 3.18 | 20,900 | 369 | 350 | 1.5 | 2.500 | 6.86 | 4 | 0.42 | B11 |
| PI | 22.6 | 2.3 | 3.18 | 20,900 | 369 | 350 | 1.75 | 2,500 | 6.86 | 16 | — | B11 |
| PI | 22.6 | 2.3 | 3.18 | 20,900 | 369 | 350 | 2.0 | 2,500 | 6.86 | 66 | — | B11 |

P: Phosphorus S: sulfur PI: Present invention

TABLE 9

Effect of the addition of cyclic light oil and coker gas-oil (LCO and CG, respectively).

| | % by weight | | | Feedstock PLG | | | Reaction conditions | | | | Diesel product | | |
|---|---|---|---|---|---|---|---|---|---|---|---|---|---|
| | | Additives | | S | N | LCO | T | LHSV | H$_2$/HC | Pres. | S | N | |
| | Ni + Mo | P | S | ppm | ppm | % | (° C.) | (h$^{-1}$) | ft$^3$/bbl | MPa | ppm | ppm | Cat. |
| PI | 17.21 | 2.45 | 2.83 | 17,900 | 257 | 0 | 350 | 1.3 | 2,500 | 6.86 | 8.5 | <0.3 | B10 |
| PI | 17.21 | 2.45 | 2.83 | 17,900 | 257 | 15 | 350 | 1.3 | 2,500 | 6.86 | 15.8 | — | B10 |
| PI | 17.21 | 2.45 | 2.83 | 17,900 | 257 | 25 | 350 | 1.3 | 2,500 | 6.86 | 17 | — | B10 |
| PI | 17.21 | 2.45 | 2.83 | 17,900 | 257 | 5* | 350 | 1.3 | 2,500 | 6.86 | 54 | 0.8 | B10 |
| PI | 20.21 | 2.53 | 2.25 | 17,900 | 257 | 0 | 350 | 1.5 | 2,500 | 6.86 | 4 | 0.48 | B7 |
| PI | 20.21 | 2.53 | 2.25 | 17,900 | 257 | 5 | 350 | 1.5 | 2,500 | 6.86 | 4.8 | 0.41 | B7 |
| PI | 20.21 | 2.53 | 2.25 | 17,900 | 257 | 15 | 350 | 1.5 | 2,500 | 6.86 | 13.4 | 0.44 | B7 |

*In this mixture was employed 5% by volume of coker gas oil in PLG.
P: phosphorus S: sulfur A: alumina PI: present invention PLG: primary iight gas-oil LCO: light cycle oil

TABLE 10

Combination of catalytic formulations at various LHSV and operating temperature values.

| | % by weight | | | | Feedstock PLG | | Reaction conditions | | | | Diesel product | | |
|---|---|---|---|---|---|---|---|---|---|---|---|---|---|
| | CoMo | NiMo | Additives P | S | S ppm | N ppm | T (° C.) | LHSV h⁻¹ | H₂/HC ft³/bbl | P MPa | S ppm | N ppm | Cat. |
| PI | 17.61 | — | 2.8 | 2.82 | 20,900 | 369 | 350 | 1.5 | 2,500 | 6.86 | 47 | — | B13 |
| PI | — | 22.6 | 2.3 | 3.18 | 20,900 | 369 | 350 | 1.5 | 2,500 | 6.86 | 4 | 0.42 | B11 |
| | NiMo + CoMo | | | | | | | | | | | | |
| PI | | 20.1 | 2.45 | 2.7 | 20,900 | 369 | 340 | 1.5 | 2,500 | 6.86 | 535 | — | B11-B13 |
| PI | | 20.1 | 2.45 | 2.7 | 20,900 | 369 | 345 | 1.5 | 2,500 | 6.86 | 156 | — | B11-B13 |
| PI | | 20.1 | 2.45 | 2.7 | 20,900 | 369 | 350 | 1.5 | 2,500 | 6.86 | 16 | 0.63 | B11-B13 |
| PI | | 20.1 | 2.45 | 2.7 | 20,900 | 369 | 350 | 1.75 | 2,500 | 6.86 | 171 | — | B11-B13 |
| PI | | 20.1 | 2.45 | 2.7 | 20,900 | 369 | 350 | 2 | 2,500 | 6.86 | 303 | — | B11-B13 |
| | CoMo + NiMo | | | | | | | | | | | | |
| PI | | 20.1 | 2.45 | 2.7 | 20,900 | 369 | 340 | 1.5 | 2,500 | 6.86 | 314 | — | B13-B11 |
| PI | | 20.1 | 2.45 | 2.7 | 20,900 | 369 | 345 | 1.5 | 2,500 | 6.86 | 97 | — | B13-B11 |
| PI | | 20.1 | 2.45 | 2.7 | 20,900 | 369 | 350 | 1.5 | 2,500 | 6.86 | 8 | 0.47 | B13-B11 |
| PI | | 20.1 | 2.45 | 2.7 | 20,900 | 369 | 350 | 1.75 | 2,500 | 6.86 | 82 | — | B13-B11 |
| PI | | 20.1 | 2.45 | 2.7 | 20,900 | 369 | 350 | 2 | 2,500 | 6.86 | 141 | — | B13-B11 |

P: Phosphorus S: sulfur PI: present invention

TABLE 11

Combination of catalytic formulations at different LHSV and temperature, Zeton pilot plant.

| | % by weight | | | | Feedstock PLG | | | Reaction conditions | | | | Diesel product | | |
|---|---|---|---|---|---|---|---|---|---|---|---|---|---|---|
| | CoMo + NiMo | Additives P | S | Supp | S ppm | N ppm | LCO % | T (° C.) | LHSV (h⁻¹) | H₂/HC ft³/bbl | P. MPa | S ppm | N ppm | Cat. |
| PI | 20.1 | 2.67 | 3.18 | AS | 20,900 | 369 | 0 | 350 | 1.5 | 2500 | 6.86 | 15.6 | 0.7 | B13-B11 |
| PI | 20.1 | 2.67 | 3.18 | AS | 20,900 | 369 | 0 | 350 | 1.3 | 2500 | 6.86 | 10.5 | 0.6 | B13-B11 |
| PI | 20.1 | 2.67 | 3.18 | AS | 20,600 | 277 | 5 | 345 | 1.3 | 2500 | 6.86 | 11.3 | 0.5 | B13-B11 |
| PI | 20.1 | 2.67 | 3.18 | AS | 21,580 | 289 | 10 | 340 | 1.3 | 2500 | 6.86 | 13.1 | 0.5 | B13-B11 |
| PI | 20.1 | 2.67 | 3.18 | AS | 22,190 | 294 | 15 | 350 | 1.3 | 2500 | 6.86 | 16.9 | 0.7 | B13-B11 |
| PI | 20.1 | 2.67 | 3.18 | AS | 22,697 | 298 | 20 | 350 | 1.3 | 2500 | 6.86 | 18.3 | 0.6 | B13-B11 |

P: phosphorus S: sulfur AS: alumina-silica LCO: Cyclic light oil PI: present invention

The invention claimed is:

1. A process for obtaining a catalytic formulation for the production of diesel fuel that consists of 2-8 wt % of one non-noble metal of Group VIII B and 12-18 wt % of one metal of Group VI B, and 1-3 wt % of phosphorus compound, deposited on a support comprising aluminum oxide where the support surface is modified by $SiO_2$, and a metal to ligand charge-transfer complex formed by thioglycolic acid with said Group VI B metal, the process comprising the following steps:
   a) providing a hydroxylated alumina precursor paste, a hydrated alumina precursor paste or mixture thereof obtained by first calcining alumina and then adding an acid solution selected from the group consisting of phosphoric acid, citric acid, nitric acid, and acetic acid;
   b) shaping said hydrated alumina paste or hydroxylated alumina paste obtained in step a) into cylindrical or trilobed or tetralobed extrudates;
   c) heat treating the extrudates obtained in step b) by calcination under dynamic air at a temperature ranging between 500 and 700° C. to obtain calcined extrudates, wherein said calcined extrudates are in gamma-alumina phase, have a specific surface area between 200 to 400 m²/g by BET method, a pore volume of 0.5 cm³/g or more, and an average pore diameter between 7 to 15 nm;
   d) solubilizing an organic silicon compound comprising tetraethyl orthosilicate in ethanol;
   e) preparing a solution containing a hydrolysis catalyst comprising nitric acid, water, and ethanol;
   f) adding the solution prepared in step e) to the solution prepared in subsection d) by dripping;
   g) refluxing the solution prepared in step f) at a temperature between 20 and 80° C. for a period of time of 8 hours or less to obtain a hydrolysis solution;
   h) contacting the hydrolysis solution prepared in step g) with the calcined extrudates obtained in step c) for a period of time between 0.5 and 8 hours at room temperature of 25° C.;
   i) filtering the calcined extrudates obtained in step h);
   j) drying the filtered calcined extrudates obtained in step i) at a temperature between 80 and 120° C. for a period of time from 6 to 18 hours to obtain dried calcined extrudates;
   k) heat treating the dried calcined extrudates obtained in step j) by calcination under dynamic air at temperature between 300 and 600 for a period of time between 4 and 18 hours to obtain a $SiO_2$ surface modified alumina support, wherein said surface modified alumina support has a $SiO_2$ content from 2.0% to 15% by weight, a specific surface area between 250 to 350 m²/g by the BET method, a pore volume between 0.5 to 1.2 cm³/g, and an average pore diameter between 7 to 12 nm;

l) preparing an aqueous suspension of a compound containing said Group VI B metal and said phosphorus compound;

m) digesting the suspension in step l) by heat treatment at reflux temperature between 60° C. and 90° C., until said compound containing said Group VI B metal is dissolved to obtain a clear solution;

n) adding a compound containing said non-noble Group VIII B metal to the solution obtained in step m);

o) stirring the solution obtained in step n) and continuing thermal digestion at a temperature between 60 and 90° C. by refluxing for a period of time between 1 and 6 hours;

p) concentrating the solution obtained in step o) by evaporation to a volume required to perform impregnation of the support by incipient wetness;

q) impregnating the solution obtained in step p) to said extruded surface modified alumina support of step k);

r) drying the material obtained in step q) at a temperature between 80 and 120° C. for a period of time between 4 and 18 hours and further calcining at 350 to 500° C. for a period of time of 4 to 24 hours;

s) preparing a thioglycolic acid solution in water;

t) impregnating the solution obtained in step s) into the calcined material obtained in step r) to produce a ligand metal charge-transfer (LMCT) complex containing said Group VI B metal;

u) drying the material obtained in step t) at a temperature between 60° C. and 100° C.; and v) sulfiding the material obtained in step u) to obtain said catalytic formulation.

2. The process according to claim 1 wherein the calcination step c) is carried out at temperature between 300 and 600° C.

3. The process according to claim 1, wherein said non-noble metal of Group VIII B is nickel.

4. The process according to claim wherein tire Group VI B metal of step (s) is molybdenum.

5. The process according to claim wherein said Group VIII B metal is nickel, and said LMCT complex formation by reaction of thioglycolic acid with said Group VI B metal of step (t) is characterized by a color change of impregnated $SiO_2$-modified alumina extrudates from green to blue.

6. The process according to claim 1, wherein the sulfidation step of stepv) is under gas flow comprising a mixture of hydrogen sulfide ($H_2S$) and hydrogen at a temperature between 200 and 600° C. and at atmospheric pressure.

7. The process according to claim 1 wherein the sulfiding step of stepv) is in presence of a liquid hydrocarbon stream containing at least 1% by weight of sulfur at hydrogen pressure between 1 and 100 kg/cm² at a temperature ranging from 200 to 600° C.

8. The process of claim 1, where the dried material of step u) comprises 12-18 wt % Mo, 2-8 wt % Ni, and 1-3 wt % P.

9. The process of claim 1, where the dried material of step u) before the sulfiding step v) further comprising 1-10 wt % sulfur and 0.5 to 15 wt % carbon.

10. The process of claim 1, wherein said catalytic formulation after activation by sulfiding has a sulfur concentration between 1% and 15% by weight.

11. The process of claim 1, wherein said phosphorus compound in step l) is $H_3PO_4$.

12. The process according to claim 1, further comprising drying the imprecated material formulation of step u) at a temperature between 60° C. and 100° C., for a period of time between 2 and 24 hours.

13. The process of claim 1, said sulfiding process step v) comprising:

a) loading the impregnated formulation of step u) in a tubular fixed bed reactor that operates under continuous flow and at high pressure;

b) adjusting the $H_2$ flow at hydrogen/hydrocarbon ratio from 850 to 2000 ft³/bbl (cubic feet/barrel);

c) adjusting the pressure between 35 to 60 kg/cm²;

d) feeding a liquid hydrocarbon fraction doped in its sulfur content to a concentration between 2 and 5% by weight;

e) adjusting the hydrocarbon fraction flow to an LHSV between 1 and 2 hour⁻¹;

f) increasing the temperature from room temperature (25° C.) up to a value between 120 and 150° C. with heating rate between 30 and 50° C./hour;

g) increasing the temperature from the one reached in the subsection f) up to a value between 250 and 280° C. at a heating rate between 10 and 30° C./hour;

h) maintaining the condition reached in subsection g) for a period of time between 1 to 8 hours;

i) increasing the temperature from the one reached in subsection g) up to a value between 290 and 300° C. at a heating rate between 10 and 30° C./hour;

j) maintaining the condition reached in subsection i) for a period of time between 1 to 5 hours;

k) increasing the temperature from the cute reached in subsection i) up to a value between 330 and 350° C. at a heating rate between 10 and 30° C./hour;

l) maintaining the condition reached in subsection k) for a period of time between 1 to 5 hours;

m) adjusting the hydrogen flow to the required hydrogen/hydrocarbon ratio for catalyst testing, between 1500 and 3000 ft³/bbl (cubic feet/barrel):

n) adjusting the pressure to the one required for catalyst testing, between 40 and 80 kg/cm²;

o) changing the feeding of liquid hydrocarbon from the traction doped with sulfur to the one to be desulfurized;

p) setting tire space-velocity (LHSV) to the condition required for the catalytic test, between 1 and 2.5 hour⁻¹; and q) adjusting the temperature to the one required for the catalytic test, between 330 and 380° C., at a heating rate between 3 to 10° C./min.

14. The process of claim 1, wherein said solution of step (n) contains said Group VI B metal compound and said Group VIII B metal compound at a 0.1:1 to 1:1 metal ratio, phosphorus, and thioglycolic acid.

* * * * *